US012726045B2

(12) United States Patent
Youn et al.

(10) Patent No.: US 12,726,045 B2
(45) Date of Patent: Sep. 1, 2026

(54) PDE BRANCHING METHOD AND DEVICE IN WIRELESS POWER TRANSMISSION SYSTEM

(71) Applicant: LG ELECTRONICS INC., Seoul (KR)

(72) Inventors: Jinho Youn, Seoul (KR); Gyunghwan Yook, Seoul (KR); Yongcheol Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 495 days.

(21) Appl. No.: 18/272,998

(22) PCT Filed: Jan. 25, 2022

(86) PCT No.: PCT/KR2022/001302
§ 371 (c)(1),
(2) Date: Jul. 18, 2023

(87) PCT Pub. No.: WO2022/164174
PCT Pub. Date: Aug. 4, 2022

(65) Prior Publication Data

US 2024/0088713 A1 Mar. 14, 2024

(30) Foreign Application Priority Data

Jan. 26, 2021 (KR) ........................ 10-2021-0010661

(51) Int. Cl.
*H02J 50/10* (2016.01)
*H02J 50/40* (2016.01)
(Continued)

(52) U.S. Cl.
CPC ............ *H02J 50/10* (2016.02); *H02J 50/402* (2020.01); *H02J 50/80* (2016.02); *H04B 5/263* (2024.01); *H04B 5/266* (2024.01); *H04B 5/45* (2024.01)

(58) Field of Classification Search
CPC .......... H02J 50/12; H02J 50/70; H02J 50/005; H02J 50/80; H02J 50/90; H02J 50/60;
(Continued)

(56) References Cited

U.S. PATENT DOCUMENTS

| | | | | |
|---|---|---|---|---|
| 2019/0280534 | A1* | 9/2019 | Park | H02J 50/10 |
| 2019/0296591 | A1* | 9/2019 | Park | H02J 50/10 |
| 2022/0027728 | A1 | 1/2022 | Han et al. | |

FOREIGN PATENT DOCUMENTS

| | | | |
|---|---|---|---|
| CN | 111566897 | A | 8/2020 |
| WO | 2021006515 | A1 | 1/2021 |

OTHER PUBLICATIONS

"The Qi Wireless Power Transfer System Power Class 0 Specification," Parts 1 and 2: Interface Definitions, Version 1.2.4, Feb. 2018, pp. 1-179.

* cited by examiner

*Primary Examiner* — Ajibola A Akinyemi
(74) *Attorney, Agent, or Firm* — BRYAN CAVE LEIGHTON PAISNER LLP

(57) ABSTRACT

The present specification provides a method by which a wireless power receiver transmits support information in a wireless power transmission system, and a device, the method comprising: entering a configuration phase with a wireless power transmitter; and transmitting support information to the wireless power transmitter in the configuration phase, wherein the support information includes information related to a power transfer protocol supported by means of the wireless power receiver.

6 Claims, 34 Drawing Sheets

(51) Int. Cl.
*H02J 50/80* (2016.01)
*H04B 5/26* (2024.01)
*H04B 5/45* (2024.01)

(58) Field of Classification Search
CPC .. H02J 50/20; H02J 50/10; H02J 50/50; H02J 50/402; H02J 50/40; H02J 2310/22; H02J 7/0029
USPC .......................................................... 455/575
See application file for complete search history.

| | b7 | b6 | b5 | b4 | b3 | b2 | b1 | b0 |
|---|---|---|---|---|---|---|---|---|
| Byte 0 | Application Profile | | | | | | | |
| Byte 1 | Version | | | | | | | |
| Byte 2-N-1 | Profile-specific data | | | | | | | |

Figure 5:
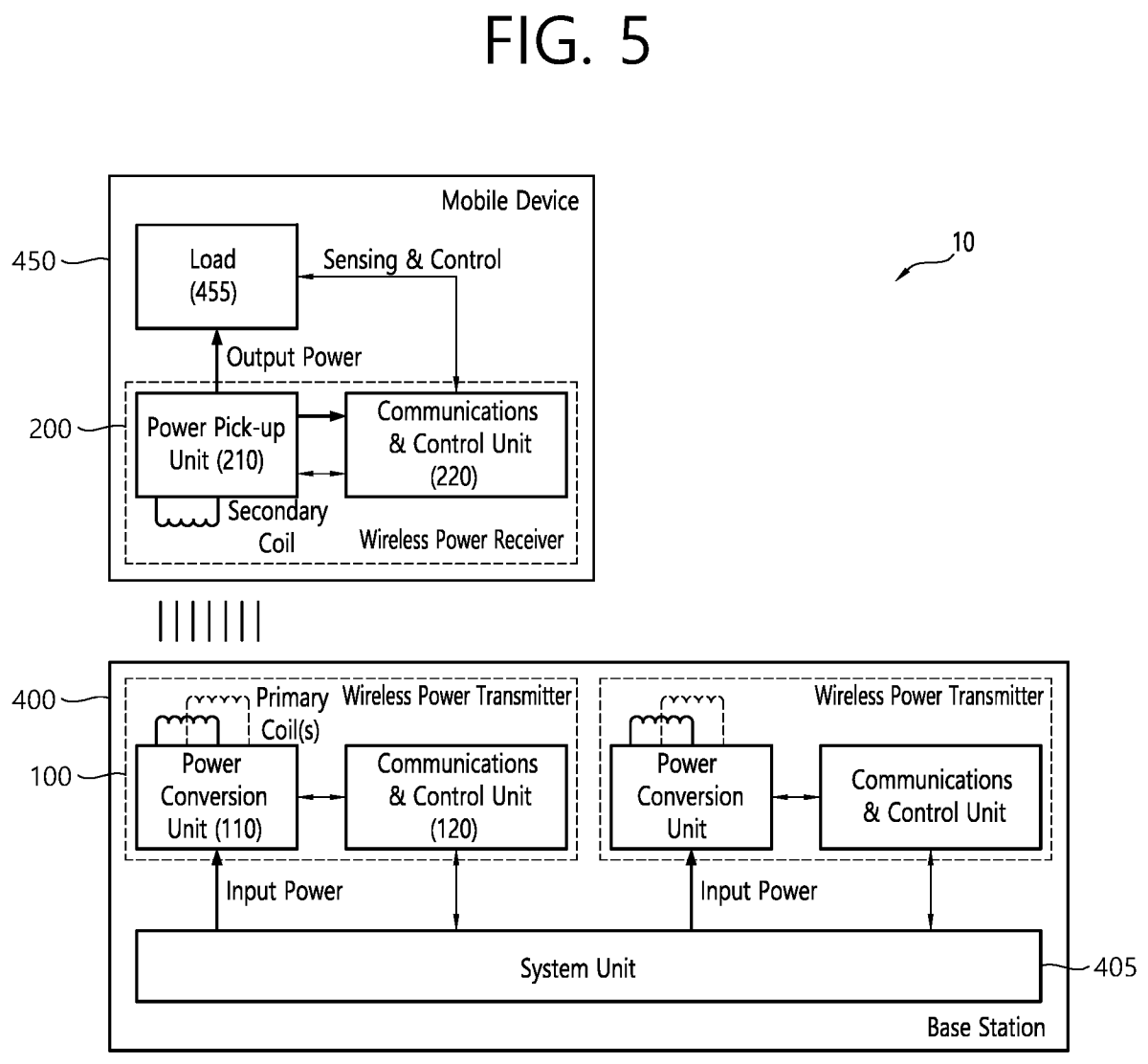

Mobile Device
450
Load (455)
Sensing & Control
Output Power
200
Power Pick-up Unit (210)
Communications & Control Unit (220)
Secondary Coil
Wireless Power Receiver 400
100
Primary Coil(s)
Power Conversion Unit (110)
Communications & Control Unit (120)
Wireless Power Transmitter
Input Power
Power Conversion Unit
Communications & Control Unit
Wireless Power Transmitter
Input Power
System Unit
405
Base Station (a) BR/EDR Protocol Stack (b) LE Protocol Stack PING PHASE
IDENTIFICATION AND CONFIGURATION PHASE
NEGOTIATION PHASE
CALIBRATION PHASE
POWER TRANSFER PHASE
RENEGOTIATION PHASE
SELECTION PHASE
510
520
530
540
550
560
570
S501
S502
S504
S506
S507
S508
S509
S510
S511
S512
S513

200
WIRELESS POWER RECEIVER
210
POWER PICK-UP UNIT
DETERMINE ACTUAL CONTROL POINT
SELECT DESIRED CONTROL POINT
CALCULATE CONTROL ERROR VALUE
CONTROL ERROR PACKET
100
POWER CONVERSION UNIT
110
SET NEW OPERATING POINT
CONTROL NEW PRIMARY COIL CELL CURRENT
DETERMINE ACTUAL PRIMARY COIL CELL
DETERMINE NEW PRIMARY COIL CELL CURRENT
WIRELESS POWER TRANSMITTER

| | $b_7$ | $b_6$ | $b_5$ | $b_4$ | $b_3$ | $b_2$ | $b_1$ | $b_0$ |
|---|---|---|---|---|---|---|---|---|
| $B_0$ | '00' | | Reference Power | | | | | |
| $B_1$ | Reserved | | | | | | | |
| $B_2$ | ZERO | AI | Reserved | OB | ZERO | Count | | |
| $B_3$ | Window Size | | | | | Window Offset | | |
| $B_4$ | Neg | Pol | Depth | | Buffer Size | | | Dup |

| | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

FIG. 19

FIG. 21
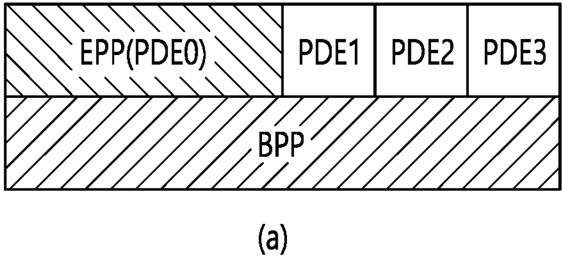
(a)
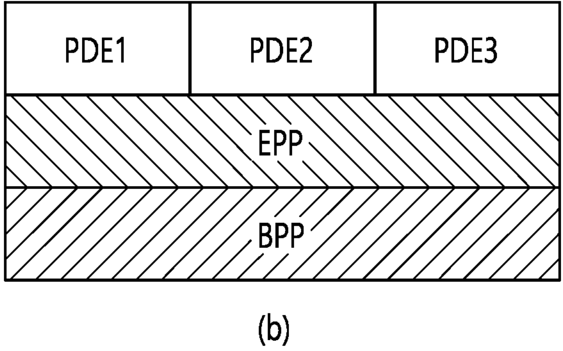
(b)
FIG. 22
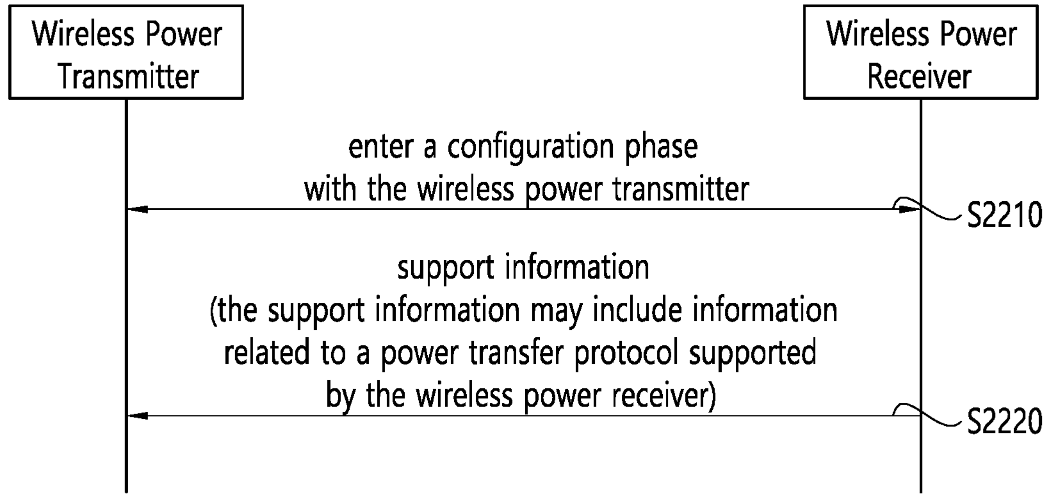

FIG. 33

| | $b_7$ | $b_6$ | $b_5$ | $b_4$ | $b_3$ | $b_2$ | $b_1$ | $b_0$ |
|---|---|---|---|---|---|---|---|---|
| $B_0$ | Request (0X07) | | | | | | | |
| $B_1$ | Parameter (0X01) | | | | | | | |

| Value | Mnemonic | Name |
|---|---|---|
| 0x07 | SRQ/ppde | Whether or not PPDE is supported |

Parameter value
0x01 : PDE1 (e.g. Apple magsafe)
0x02 : PDE2 (e.g. Huawei super charger)
0x03 : PDE3 (e.g. Xiaomi Turbo charger)
0x04 : PDE4 (e.g. LGE PPDE)
.......

FIG. 35

| | $b_7$ | $b_6$ | $b_5$ | $b_4$ | $b_3$ | $b_2$ | $b_1$ | $b_0$ |
|---|---|---|---|---|---|---|---|---|
| $B_0$ | PDE type | | Negotiable Load Power | | | | | |
| $B_1$ | PDE | Reserved | Potential Load Power | | | | | |
| $B_2$ | Dup | AR | OB | Buffer Size | | | WPID | NRS |

*PDE type
0x01 : PDE1 (e.g. Apple magsafe)
0x02 : PDE2 (e.g. Huawei super charger)
0x03 : PDE3 (e.g. Xiaomi Turbo charger)
0x04 : PDE4 (e.g. LGE PPDE)
.......

*PDE
1 : PDE is supported
0 : PDE is not supported

FIG. 36

| | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | | | | | | |
| $B_1$ | PDE | Reserved | | | TPS | TDE | TDS | |
| $B_2$ | PDE type | | | | | | | |

*PDE type
0x01 : PDE1 (e.g. Apple magsafe)
0x02 : PDE2 (e.g. Huawei super charger)
0x03 : PDE3 (e.g. Xiaomi Turbo charger)
0x04 : PDE4 (e.g. LGE PPDE)
.......

*PDE
1 : PDE is supported
0 : PDE is not supported

FIG. 37

| | $b_7$ | $b_6$ | $b_5$ | $b_4$ | $b_3$ | $b_2$ | $b_1$ | $b_0$ |
|---|---|---|---|---|---|---|---|---|
| $B_0$ | Major Version | | | | Major Version | | | |
| $B_1$ | PDE | Manufacturer code | | | | | | |
| $B_2$ | PDE type | | | | | | | |

*PDE type
0x01 : PDE1 (e.g. Apple magsafe)
0x02 : PDE2 (e.g. Huawei super charger)
0x03 : PDE3 (e.g. Xiaomi Turbo charger)
0x04 : PDE4 (e.g. LGE PPDE)
.......

*PDE
1 : PDE is supported
0 : PDE is not supported

FIG. 39

| | $b_7$ | $b_6$ | $b_5$ | $b_4$ | $b_3$ | $b_2$ | $b_1$ | $b_0$ |
|---|---|---|---|---|---|---|---|---|
| $B_0$ | Request for PPDE support | | | | | | | |

| Value | Mnemonic | Name |
|---|---|---|
| 0x4F (T.B.D) | PPDE (T.B.D) | Whether or not PPDE is supported (T.B.D) |

| | $b_7$ | $b_6$ | $b_5$ | $b_4$ | $b_3$ | $b_2$ | $b_1$ | $b_0$ |
|---|---|---|---|---|---|---|---|---|
| $B_0$ | PDE1 | PDE2 | PDE3 | PDE4 | PDE5 | PDE6 | PDE7 | PDE8 |
| $B_1$ | PDE9 | PDE X | ... | ... | ... | ... | ... | ... |
| $B_2$ | ... | ... | ... | ... | ... | ... | ... | ... |

(b)

| | $b_7$ | $b_6$ | $b_5$ | $b_4$ | $b_3$ | $b_2$ | $b_1$ | $b_0$ |
|---|---|---|---|---|---|---|---|---|
| $B_0$ | 1 | 0 | 1 | 1 | 0 | 0 | 0 | 0 |
| $B_1$ | 0 | 0 | 0 | 0 | 0 | 0 | 0 | 0 |
| $B_2$ | 0 | 0 | 0 | 0 | 0 | 0 | 0 | 0 |

*PDE type
0x01 : PDE1 (e.g. Apple magsafe)
0x02 : PDE2 (e.g. Huawei super charger)
0x03 : PDE3 (e.g. Xiaomi Turbo charger)
0x04 : PDE4 (e.g. LGE PPDE)
.......

*Example of PDE packet of
PTX supporting Apple/xiaomi/lge ppde

PDE BRANCHING METHOD AND DEVICE IN WIRELESS POWER TRANSMISSION SYSTEM

CROSS-REFERENCE TO RELATED APPLICATIONS

This application is the National Stage filing under 35 U.S.C. 371 of International Application No. PCT/KR2022/001302, filed on Jan. 25, 2022, which claims the benefit of Korean Patent Application No. 10-2021-0010661 filed on Jan. 26, 2021, which is hereby incorporated by reference herein in its entirety.

TECHNICAL FIELD

This specification relates to wireless power transfer.

BACKGROUND

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Meanwhile, in a wireless power transmission system, a wireless power transmitter and a wireless power receiver support a manufacturer-specific profile, and a method for branching a PDE at this time and a device using the same are provided.

SUMMARY

According to an embodiment of the present specification, a method and apparatus for transmitting the support information from a wireless power receiver to the wireless power transmitter in the configuration phase may be provided, where the support information includes information related to a power transfer protocol supported by the wireless power receiver.

According to the present specification, an effect in which the WPC Qi standard and the PPDE of each member company are compatible with each other can be provided.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

BRIEF DESCRIPTION OF THE DRAWINGS

FIG. 5 is a block diagram of a wireless power transfer system according to another exemplary embodiment of the present disclosure.

FIG. 19 is a schematic comparison of the Qi standard with power receivers on the market.

FIG. 21 is an example of a conceptual diagram for reflecting a member company-specific profile (e.g., PPDE) to be provided in the present specification to the Qi standard.

FIG. 22 is a flowchart of a method of transmitting support information in a wireless power transmission system according to an embodiment of the present specification.

FIG. 33 illustrates an example when information related to a supported power transfer protocol is transmitted through an SRQ packet.

FIG. 35 schematically illustrates an example of a CAP according to an embodiment of the present specification.

FIG. 36 schematically illustrates an example of XCAP according to an embodiment of the present specification.

FIG. 37 schematically illustrates an example of an ID according to an embodiment of the present specification.

FIG. 39 illustrates an example of information requesting information related to a power transfer protocol supported by a wireless power transmitter.

FIG. 40 schematically illustrates an example of information related to a newly defined PDE.

MODE

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDDCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
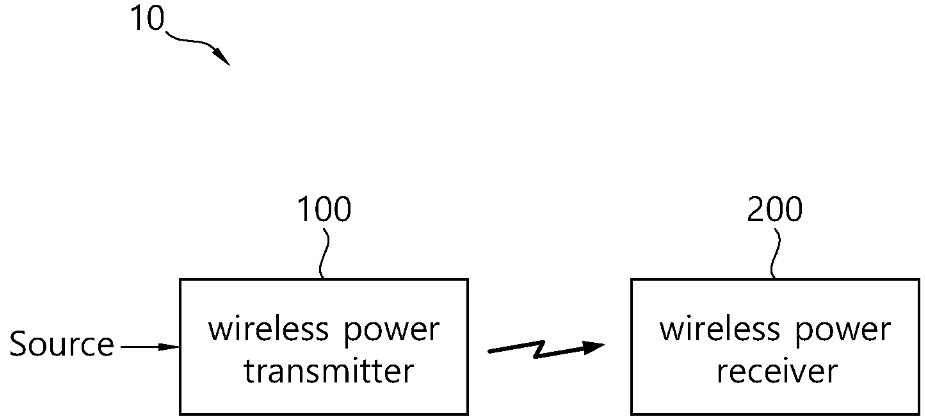
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
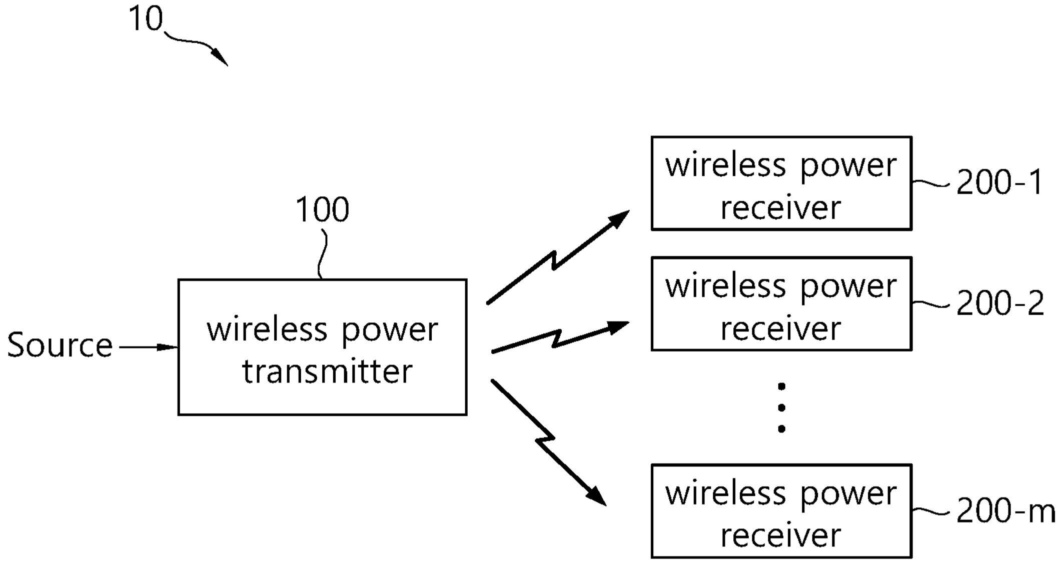
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figures 3, 4:
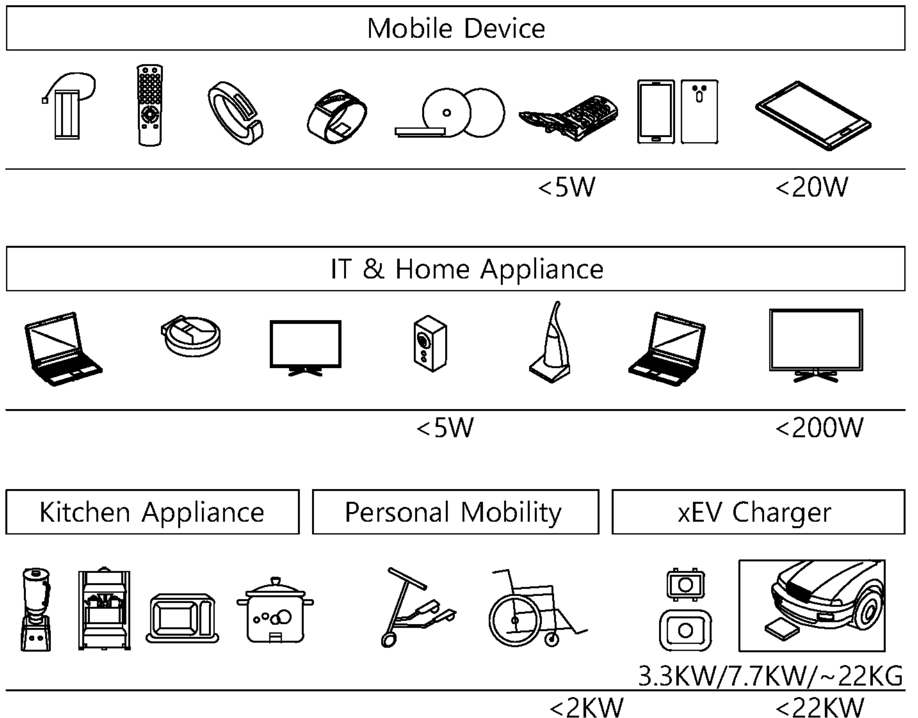
FIG. 3 shows an exemplary embodiment of diverse electronic devices adopting a wireless power transfer system.
FIG. 4 shows an example of a WPC NDEF in a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 4 shows an example of a WPC NDEF in a wireless power transfer system.

Referring to FIG. 4, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category. FIG. 5 is a block diagram of a wireless power transfer system according to another exemplary embodiment of the present disclosure. Referring to FIG. 5, the wireless power transfer system (10) includes a mobile device (450), which wirelessly receives power, and a base station (400), which wirelessly transmits power. As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 5, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 6:
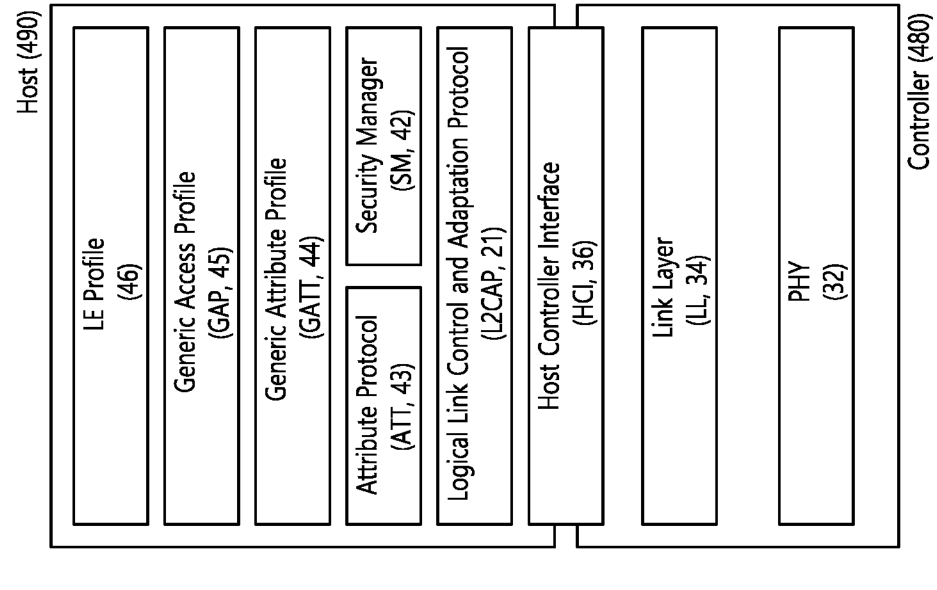
FIG. 6 is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 6.

FIG. 6 is a diagram illustrating an example of a Bluetooth communication architecture to which an embodiment according to the present disclosure may be applied.

Referring to FIG. 6, (a) of FIG. 6 shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 6, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

- Performs ACL/SCO logical transport, logical link setup, and control.
- Detach: It interrupts connection and informs a counterpart device about a reason for the interruption.
- Performs power control and role switch.
- Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 6, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 5, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 7:
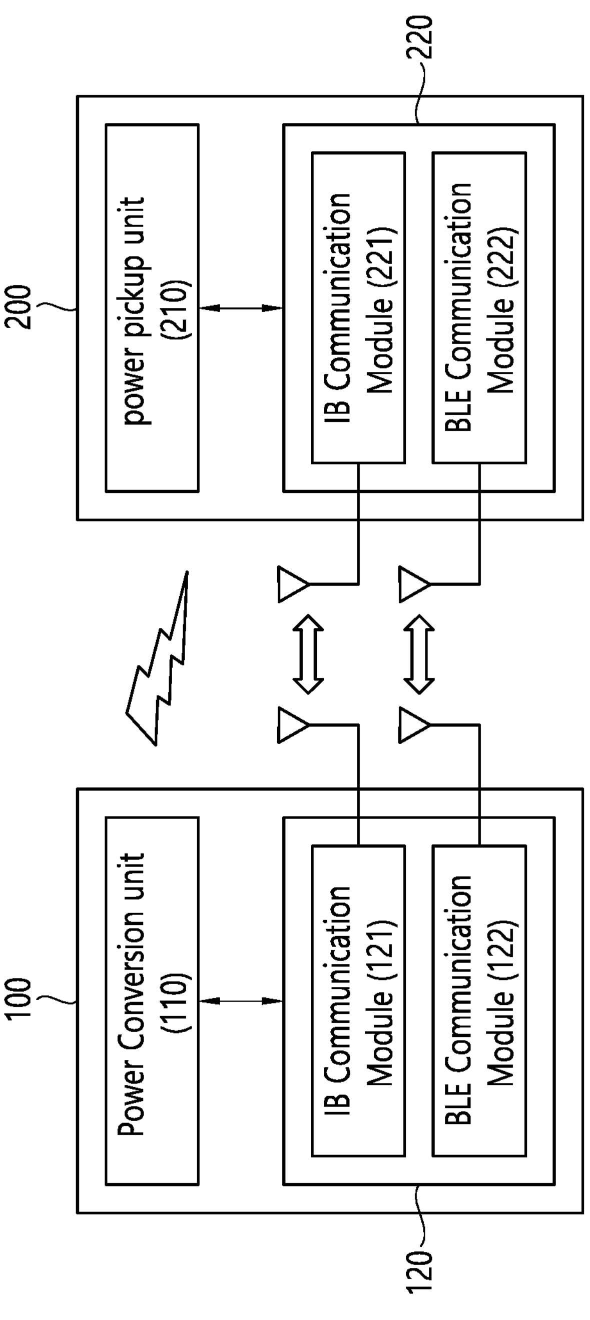
FIG. 7 is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 7.

FIG. 7 is a block diagram illustrating a wireless power transfer system using BLE communication according to an example.

Referring to FIG. 7, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 6. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 8:
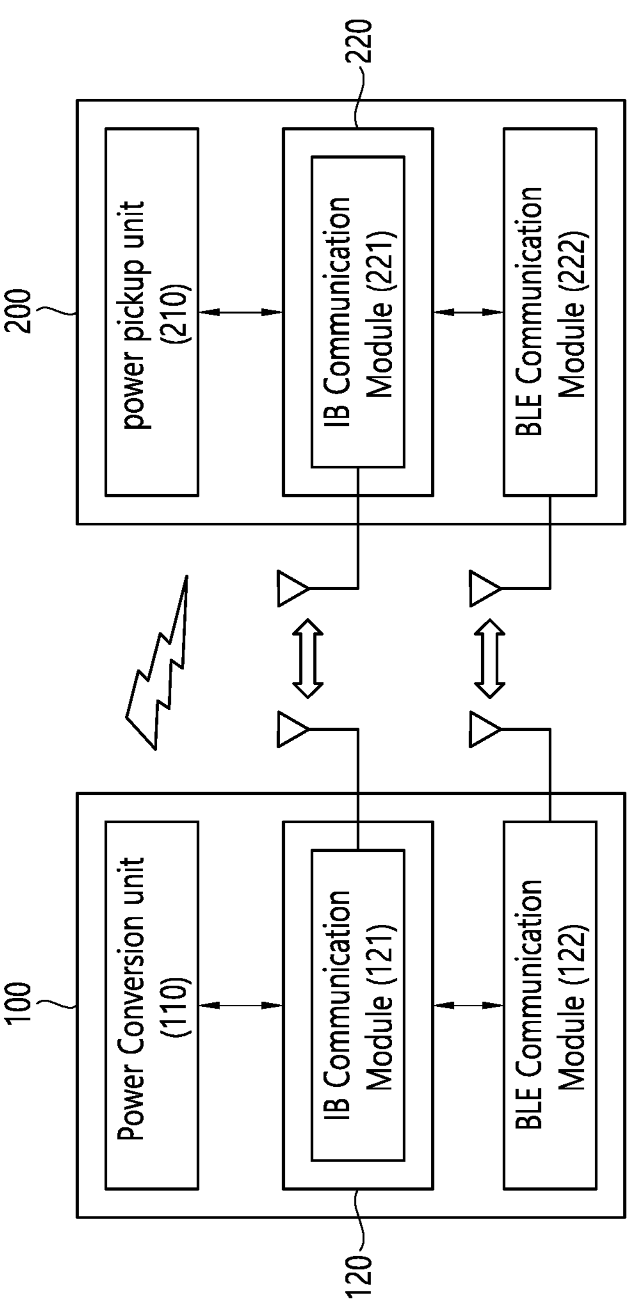
FIG. 8 is a block diagram illustrating a wireless power transfer system using BLE communication according to another example.

FIG. 8 is a block diagram illustrating a wireless power transfer system using BLE communication according to another example.

Referring to FIG. 8, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 9:
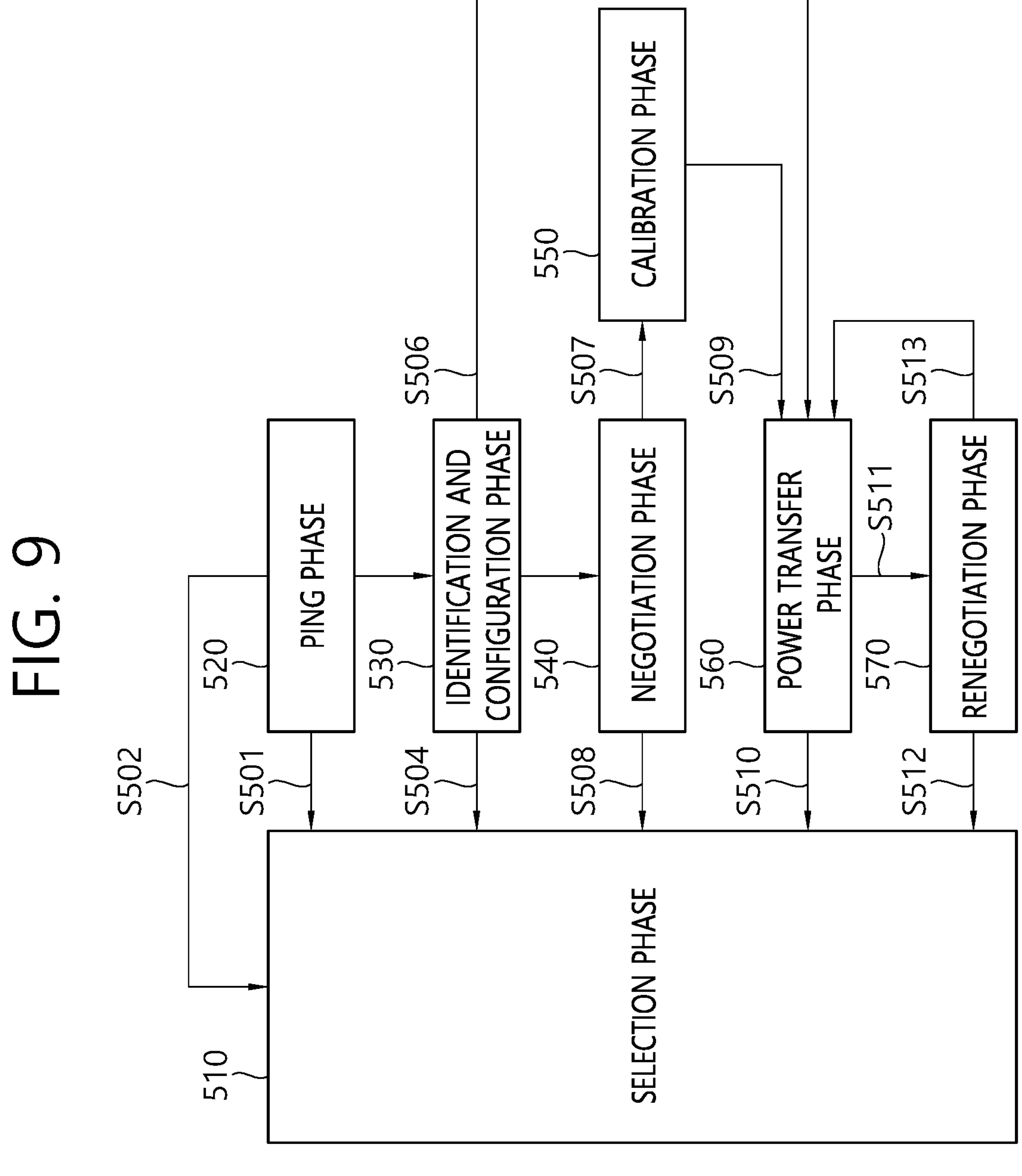
FIG. 9 is a state transition diagram for describing a wireless power transfer procedure.

FIG. 9 is a state transition diagram for describing a wireless power transfer procedure.

Referring to FIG. 9, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 10:
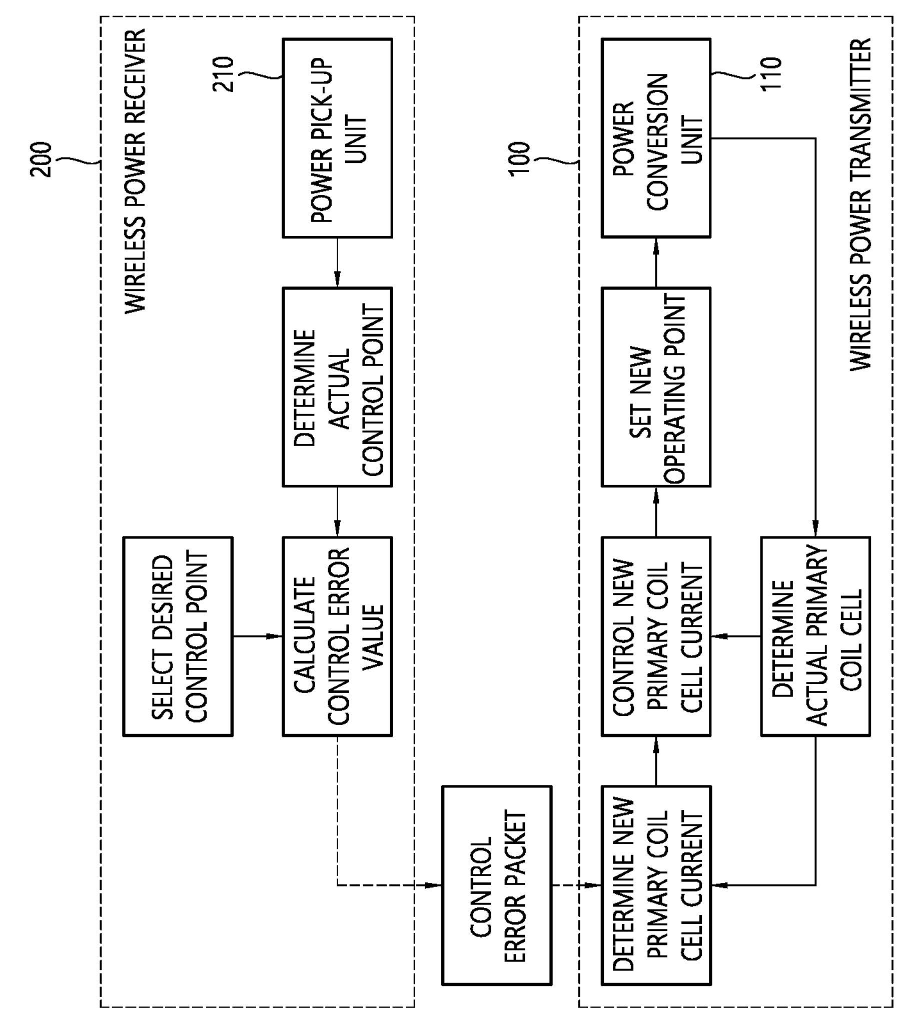
FIG. 10 shows a power control method according to an exemplary embodiment of the present disclosure.

FIG. 10 shows a power control method according to an exemplary embodiment of the present disclosure.

As shown in FIG. 10, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 10 will not be completely excluded. And, additional control of the transmitted power may be performed by using the method of FIG. 10.

Figure 11:
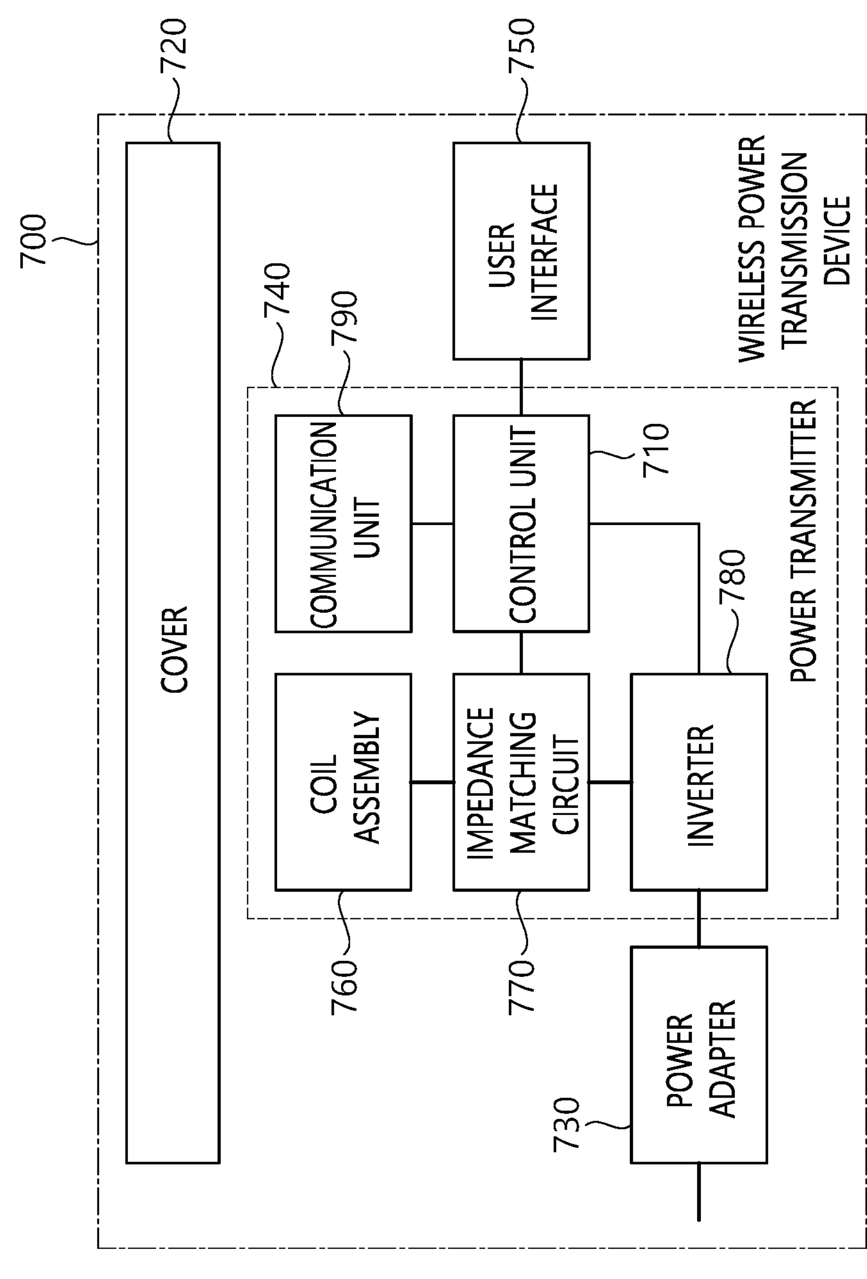
FIG. 11 is a block diagram of a wireless power transmitter according to another exemplary embodiment of the present disclosure.

FIG. 11 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 11, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 12:
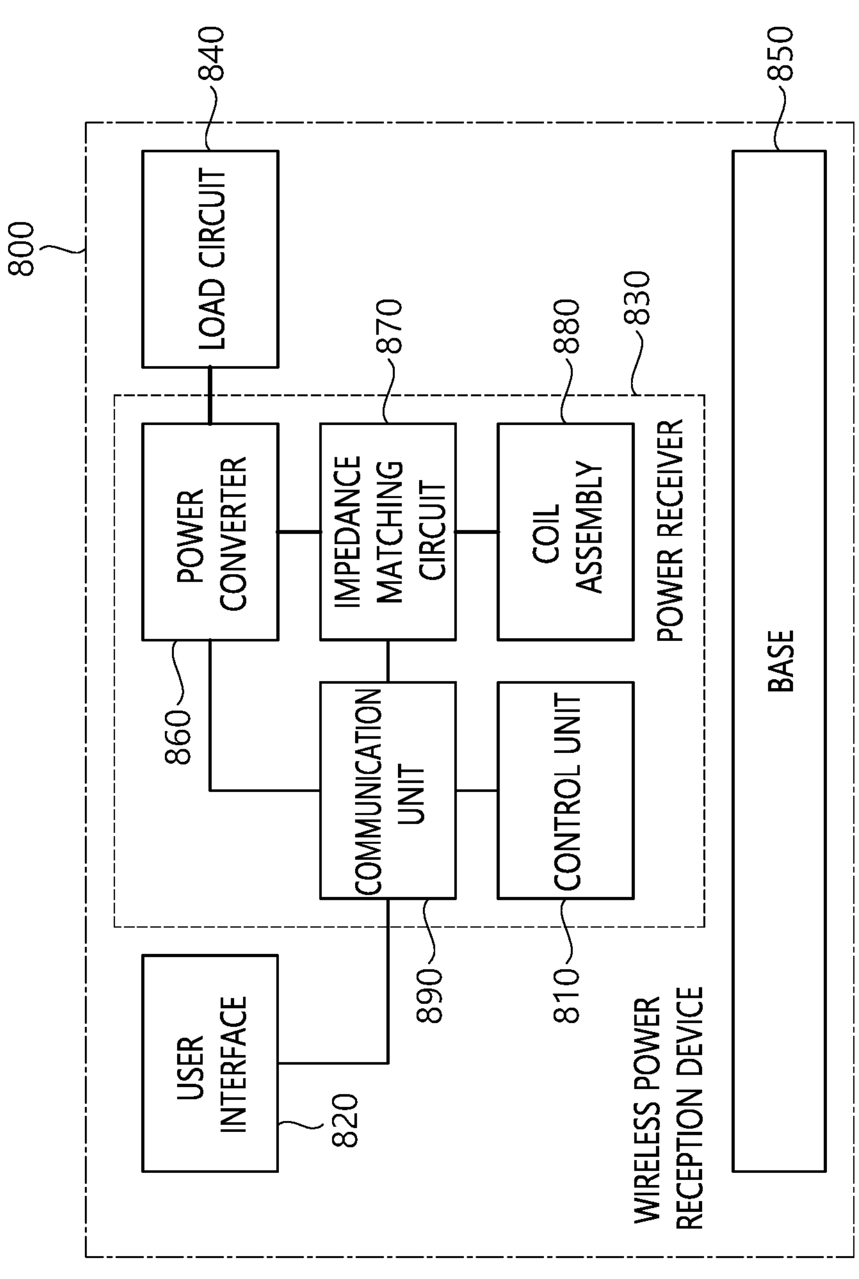
FIG. 12 shows a wireless power receiver according to another exemplary embodiment of the present disclosure.

FIG. 12 shows a wireless power receiver according to another exemplary embodiment of the present disclosure. This may belong to a wireless power transfer system that is being operated in the magnetic resonance mode or the shared mode.

Referring to FIG. 12, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as abridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

As described in FIG. 9 etc., the wireless power transmitter and the wireless power receiver go through a Ping Phase and a Configuration Phase to enter the Negotiation Phase, or may go through a ping phase, a configuration phase, and a negotiation phase to enter a power transfer phase and then to a re-negotiation phase.

Figure 13:
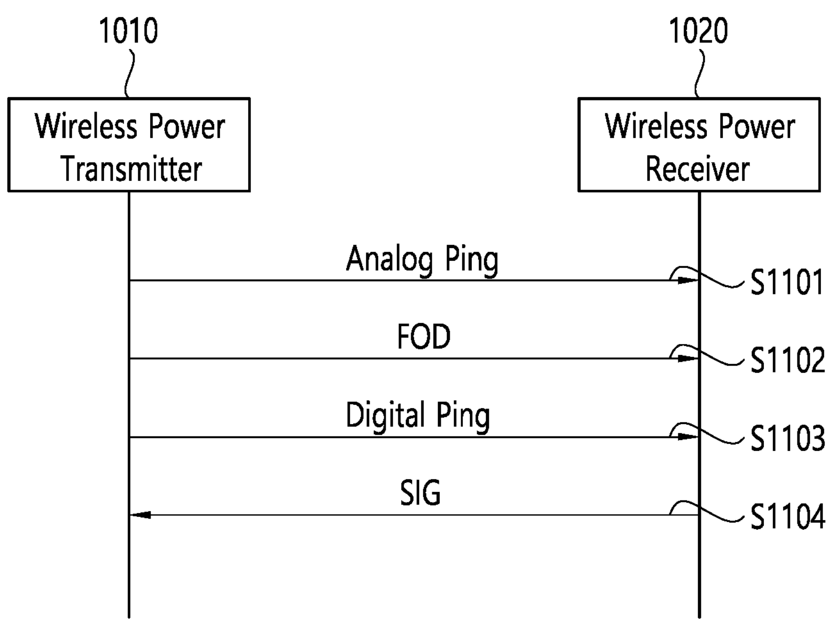
FIG. 13 is a flowchart schematically illustrating a protocol of a ping phase according to an embodiment.

FIG. 13 is a flowchart schematically illustrating a protocol of a ping phase according to an embodiment.

Referring to FIG. 13, in the ping phase, the wireless power transmitter 1010 checks whether an object exists in an operating volume by transmitting an analog ping (S1101). The wireless power transmitter 1010 may detect whether an object exists in the working space based on a change in current of a transmission coil or a primary coil.

If it is determined that an object exists in the operating volume by analog ping, the wireless power transmitter 1010 may perform foreign object detection (FOD) before power transmission to check whether a foreign object exists in the operating volume (S1102). The wireless power transmitter 1010 may perform an operation for protecting the NFC card and/or the RFID tag.

Thereafter, the wireless power transmitter 1010 identifies the wireless power receiver 1020 by transmitting a digital ping (S1103). The wireless power receiver 1020 recognizes the wireless power transmitter 1010 by receiving the digital ping.

The wireless power receiver 1020 that has received the digital ping transmits a signal strength data packet (SIG) to the wireless power transmitter 1010 (S1104).

The wireless power transmitter 1010 receiving the SIG from the wireless power receiver 1020 may identify that the wireless power receiver 1020 is located in the operating volume.

Figure 14:
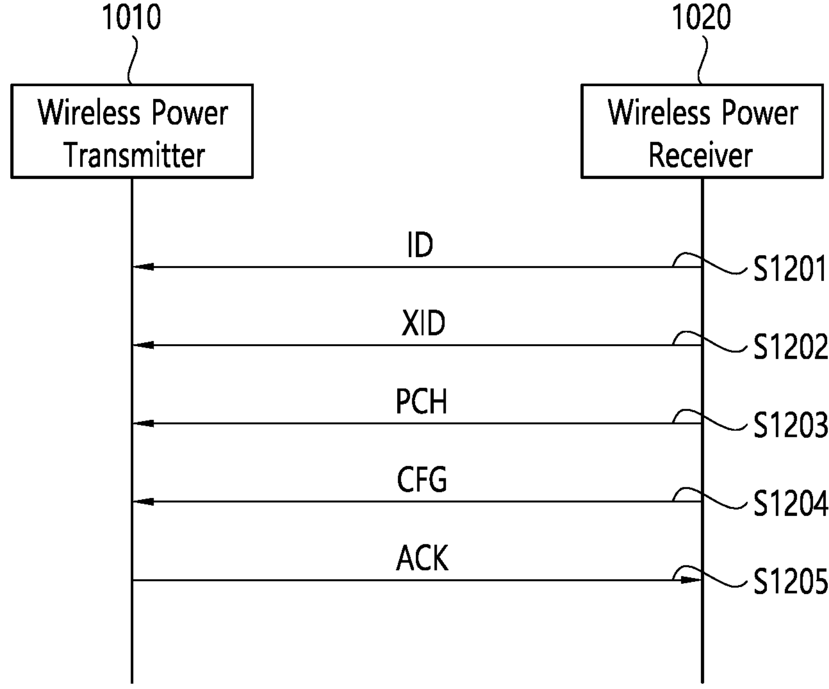
FIG. 14 is a flowchart schematically illustrating a protocol of a configuration phase according to an embodiment.

FIG. 14 is a flowchart schematically illustrating a protocol of a configuration phase according to an embodiment.

In the configuration phase (or identification and configuration phase), the wireless power receiver 1020 transmits its identification information to the wireless power transmitter 1010, the wireless power receiver 1020 and the wireless power transmitter 1010 may establish a baseline Power Transfer Contract.

Referring to FIG. 14, in the configuration phase, the wireless power receiver 1020 may transmit an identification data packet (ID) to the wireless power transmitter 1010 to identify itself (S1201). In addition, the wireless power receiver 1020 may transmit an XID (Extended Identification data packet) to the wireless power transmitter 1010 (S1202). In addition, the wireless power receiver 1020 may transmit a power control hold-off data packet (PCH) to the wireless power transmitter 1010 for a power transfer contract (S1203). In addition, the wireless power receiver 1020 may transmit a configuration data packet (CFG) to the wireless power transmitter (S1204).

In accordance with the Extended Protocol for EPP, the wireless power transmitter 1010 may transmit an ACK in response to the CFG (S1205).

Figures 15, 16:
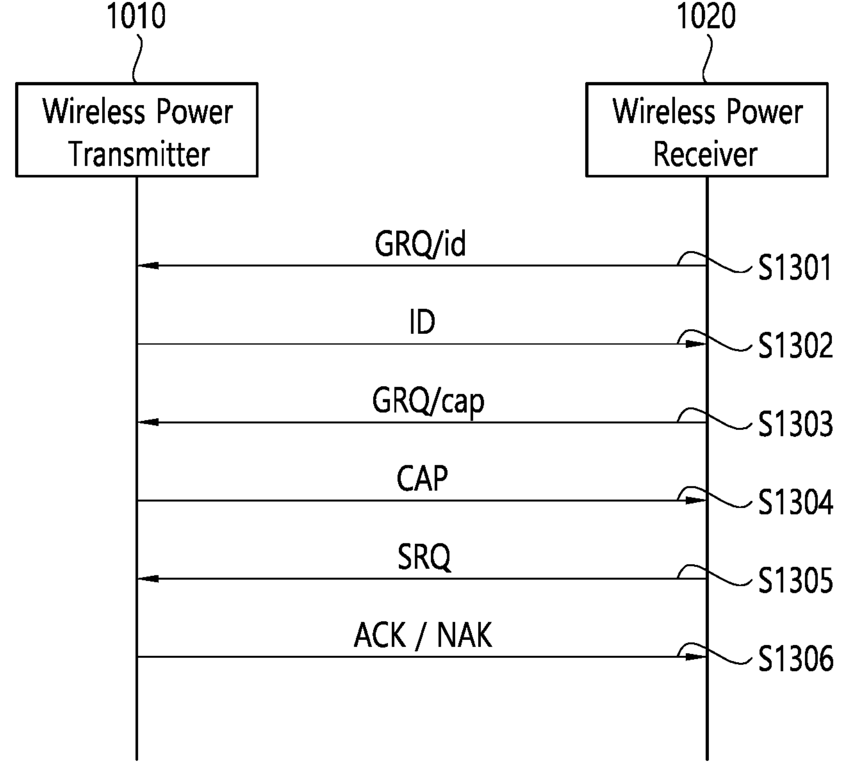
FIG. 15 is a diagram illustrating a message field of a configuration packet (CFG) of a wireless power receiver according to an embodiment.
FIG. 16 is a flowchart schematically illustrating a protocol of a negotiation step or a renegotiation step according to an embodiment.

FIG. 15 is a diagram illustrating a message field of a configuration packet (CFG) of a wireless power receiver according to an embodiment.

A configuration packet (CFG) according to an embodiment may have a header value of 0x51 and may include a message field of 5 bytes, referring to FIG. 15.

Referring to FIG. 15, the message field of the configuration packet CFG may include a 1-bit authentication (AI) flag, and a 1-bit out-of-band (OB) flag.

The authentication flag AI indicates whether the wireless power receiver 1020 supports the authentication function. For example, if the value of the authentication flag AI is '1', it indicates that the wireless power receiver 1020 supports an authentication function or operates as an authentication initiator, if the value of the authentication flag AI is '0', it may indicate that the wireless power receiver 1020 does not support an authentication function or cannot operate as an authentication initiator.

The out-band (OB) flag indicates whether the wireless power receiver 1020 supports out-band communication. For example, if the value of the out-band (OB) flag is '1', the wireless power receiver 1020 instructs out-band communication, if the value of the out-band (OB) flag is '0', it may indicate that the wireless power receiver 1020 does not support out-band communication.

In the configuration phase, the wireless power transmitter 1010 may receive the configuration packet (CFG) of the wireless power receiver 1020 and check whether the wireless power receiver 1020 supports an authentication function and supports out-of-band communication.

FIG. 16 is a flowchart schematically illustrating a protocol of a negotiation step or a renegotiation step according to an embodiment.

In the negotiation phase or renegotiation phase, the power transfer contract related to the reception/transmission of wireless power between the wireless power receiver and the wireless power transmitter is expanded or changed, or a renewal of the power transfer contract is made that adjusts at least some of the elements of the power transfer contract, or exchange of information for establishing out-band communication may be performed.

Referring to FIG. 16, in the negotiation phase, the wireless power receiver 1020 may receive an identification data packet (ID) and a capabilities data packet (CAP) of the wireless power transmitter 1010 using a general request data packet (GRQ).

The general request packet (GRQ) may have a header value of 0x07 and may include a 1-byte message field. The message field of the general request packet (GRQ) may include a header value of a data packet that the wireless power receiver 1020 requests from the wireless power transmitter 1010 using the GRQ packet. For example, when the wireless power receiver 1020 requests an ID packet of the wireless power transmitter 1010 using a GRQ packet, the wireless power receiver 1020 transmits a general request packet (GRQ/id) including a header value (0x30) of the ID packet of the wireless power transmitter 1010 in the message field of the general request packet (GRQ).

Referring to FIG. 16, in the negotiation phase or renegotiation phase, the wireless power receiver 1020 may transmit a GRQ packet (GRQ/id) requesting the ID packet of the wireless power transmitter 1010 to the wireless power transmitter 1010 (S1301).

The wireless power transmitter 1010 receiving the GRQ/id may transmit the ID packet to the wireless power receiver 1020 (S1302). The ID packet of the wireless power transmitter 1010 includes information on the Manufacturer Code. The ID packet including information on the Manufacturer Code allows the manufacturer of the wireless power transmitter 1010 to be identified.

Referring to FIG. 16, in the negotiation phase or renegotiation phase, the wireless power receiver 1020 may transmit a GRQ packet (GRQ/cap) requesting a capability packet (CAP) of the wireless power transmitter 1010 to the wireless power transmitter 1010 (S1303). The message field of the GRQ/cap may include a header value (0x31) of the capability packet (CAP).

The wireless power transmitter 1010 receiving the GRQ/cap may transmit a capability packet (CAP) to the wireless power receiver 1020 (S1304).

Figures 17, 18:
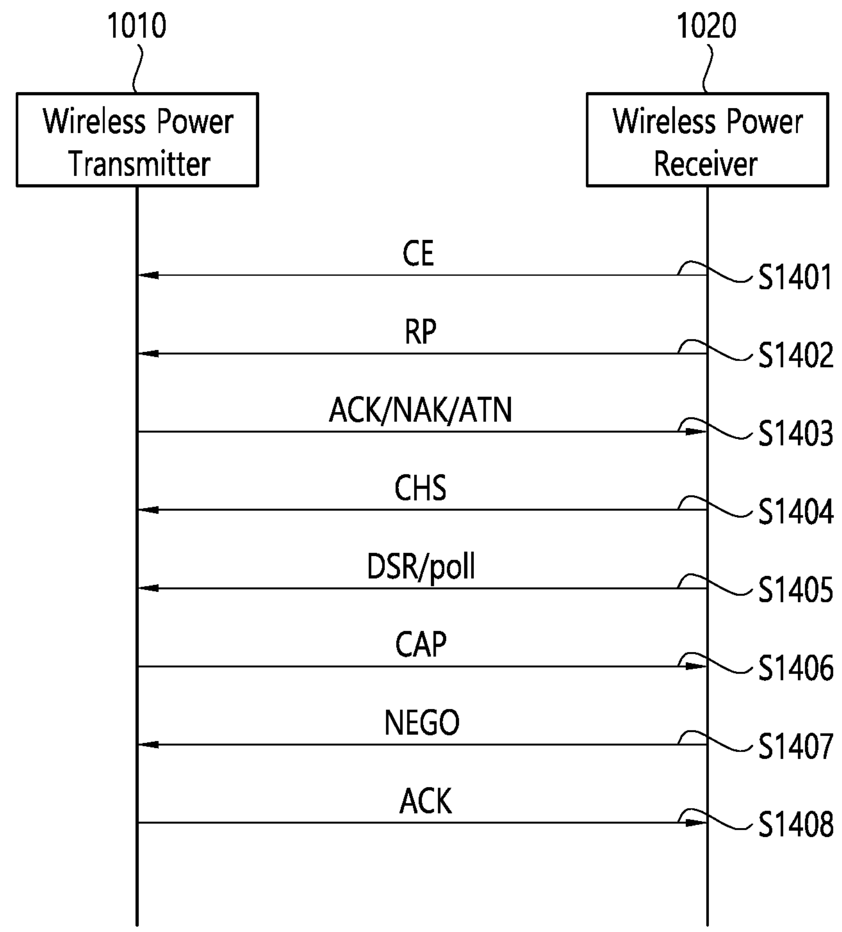
FIG. 17 is a diagram illustrating a message field of a capability packet (CAP) of a wireless power transmitter according to an embodiment.
FIG. 18 is a flowchart schematically illustrating a protocol of a power transmission step according to an embodiment.

FIG. 17 is a diagram illustrating a message field of a capability packet (CAP) of a wireless power transmitter according to an embodiment.

A capability packet (CAP) according to an embodiment may have a header value of 0x31, and referring to FIG. 17, may include a message field of 3 bytes.

Referring to FIG. 17, a 1-bit authentication (AR) flag and a 1-bit out-of-band (OB) flag may be included in the message field of the capability packet (CAP).

The authentication flag AR indicates whether the wireless power transmitter 1010 supports the authentication function. For example, if the value of the authentication flag AR is '1', it indicates that the wireless power transmitter 1010 supports an authentication function or can operate as an authentication responder, if the value of the authentication flag AR is '0', it may indicate that the wireless power transmitter 1010 does not support the authentication function or cannot operate as an authentication responder.

The out-band (OB) flag indicates whether the wireless power transmitter 1010 supports out-band communication. For example, if the value of the out-band (OB) flag is '1', the wireless power transmitter 1010 instructs out-band communication, if the value of the out-band (OB) flag is '0', it may indicate that the wireless power transmitter 1010 does not support out-band communication.

In the negotiation phase, the wireless power receiver 1020 receives a capability packet (CAP) of the wireless power transmitter 1010, it is possible to check whether the wireless power transmitter 1010 supports an authentication function, supports out-of-band communication, and the like.

And, according to FIG. 13, in the negotiation phase or re-negotiation phase, the wireless power receiver 1020 may use at least one specific request packet (SRQ, Specific Request data packet) to update the elements of the Power Transfer Contract related to the power to be provided in the power transfer phase, the negotiation phase or the re-negotiation phase may be ended (S1305).

The wireless power transmitter 1010 may transmit only ACK, only ACK or NAK, or only ACK or ND in response to the specific request packet SRQ according to the type of the specific request packet SRQ (S1306).

In the above-described ping phase, configuration phase, and negotiation/renegotiation phase, a data packet or message exchanged between the wireless power transmitter 1010 and the wireless power receiver 1020 may be transmitted/received through in-band communication.

FIG. 18 is a flowchart schematically illustrating a protocol of a power transmission step according to an embodiment.

In the power transfer phase, the wireless power transmitter 1010 and the wireless power receiver 1020 may transmit/receive wireless power based on a power transfer contract.

Referring to FIG. 18, in the power transfer phase, the wireless power receiver 1020 transmits a control error data packet (CE) including information on the difference between the actual operating point and the target operating point to the wireless power transmitter 1010 (S1401).

Also, in the power transfer phase, the wireless power receiver 1020 transmits a received power packet (RP, Received Power data packet) including information on the received power value of the wireless power received from the wireless power transmitter 1010 to the wireless power transmitter 1010 (S1402).

In the power transfer phase, the control error packet (CE) and the received power packet (RP) are data packets that are repeatedly transmitted/received according to timing constraints required for wireless power control.

The wireless power transmitter 1010 may control the level of wireless power transmitted based on the control error packet (CE) and the received power packet (RP) received from the wireless power receiver 1020.

The wireless power transmitter 1010 may respond with an 8-bit bit pattern such as ACK, NAK, ATN, etc. to the received power packet (RP) (S1403).

For a received power packet (RP/0) with a mode value of 0, when the wireless power transmitter 1010 responds with ACK, it means that power transmission can continue at the current level.

For a received power packet (RP/0) with a mode value of 0, when the wireless power transmitter 1010 responds with NAK, it means that the wireless power receiver 1020 should reduce power consumption.

For a received power packet (RP/1 or RP/2) having a mode value of 1 or 2, when the wireless power transmitter 1010 responds with ACK, it means that the wireless power receiver 1020 has accepted the power correction value included in the received power packet (RP/1 or RP/2).

For a received power packet (RP/1 or RP/2) having a mode value of 1 or 2, when the wireless power transmitter 1010 responds with NAK, it means that the wireless power receiver 1020 does not accept the power correction value included in the received power packet RP/1 or RP/2.

About Receive Power Packet (RP), when the wireless power transmitter 1010 responds with ATN, it means that the wireless power transmitter 1010 requests permission for communication.

The wireless power transmitter (1010) and the wireless power receiver (1020) can control the transmitted/received power level based on a control error packet (CE), a received power packet (RP), and a response to the received power packet (RP).

Also, in the power transfer phase, the wireless power receiver 1020 transmits a charge status data packet (CHS) including information on the charge state of the battery to the wireless power transmitter 1010 (S1404). The wireless power transmitter 1010 may control the power level of the wireless power based on the information on the state of charge of the battery included in the state of charge packet (CHS).

Meanwhile, in the power transfer phase, the wireless power transmitter 1010 and/or the wireless power receiver 1020 may enter a renegotiation phase to renew the power transfer contract.

In the power transfer phase, when the wireless power transmitter 1010 wants to enter the renegotiation phase, the wireless power transmitter 1010 responds to the received power packet (RP) with ATN. In this case, the wireless power receiver 1020 may transmit a DSR/poll packet to the wireless power transmitter 1010 to give the wireless power transmitter 1010 an opportunity to transmit a data packet (S1405).

When the wireless power transmitter 1010 transmits a performance packet (CAP) to the wireless power receiver 1020 in response to the DSR/poll packet (S1406), the wireless power receiver 1020 transmits a renegotiation packet (NEGO) requesting the progress of the re-negotiation phase to the wireless power transmitter 1010 (S1407), when the wireless power transmitter 1010 responds with an ACK to the renegotiation packet (NEGO) (S1408), the wireless power transmitter 1010 and the wireless power receiver 1020 enter a re-negotiation phase.

In the power transfer phase, when the wireless power receiver 1020 wants to enter the re-negotiation phase, the wireless power receiver 1020 transmits a renegotiation packet (NEGO) requesting the progress of the re-negotiation phase to the wireless power transmitter 1010 (S1407), when the wireless power transmitter 1010 responds with an ACK to the renegotiation packet (NEGO) (S1408), the wireless power transmitter 1010 and the wireless power receiver 1020 enter a re-negotiation phase.

Meanwhile, the wireless power transmission system may have an application layer message exchange function to support expansion into various application fields. Based on this function, device authentication related information or other application level messages may be transmitted and received between the wireless power transmitter 1010 and the wireless power receiver 1020. In this way, in order to exchange upper layer messages between the wireless power transmitter 1010 and the wireless power receiver 1020, A separate hierarchical architecture for data transmission is required, an efficient management and operation method of hierarchical architecture is required.

Hereinafter, this specification will be described in more detail.

Wireless charging methods include a magnetic induction method using a magnetic induction phenomenon between a primary coil and a secondary coil, and a magnetic resonance method in which magnetic resonance is achieved using a frequency in a band of several tens of kHz to several MHz to transmit power. Here, the wireless charging standard for the magnetic resonance method is led by a conference called A4WP, and the magnetic induction method is led by the WPC (Wireless Power Consortium). Here, the WPC is designed to exchange various status information and commands related to the wireless charging system in-band.

Meanwhile, as described above, the wireless power communication profile/protocol in the WPC Qi standard is classified into BPP (Basic Power Profile)/EPP (Extended Power Profile).

Figure 19:
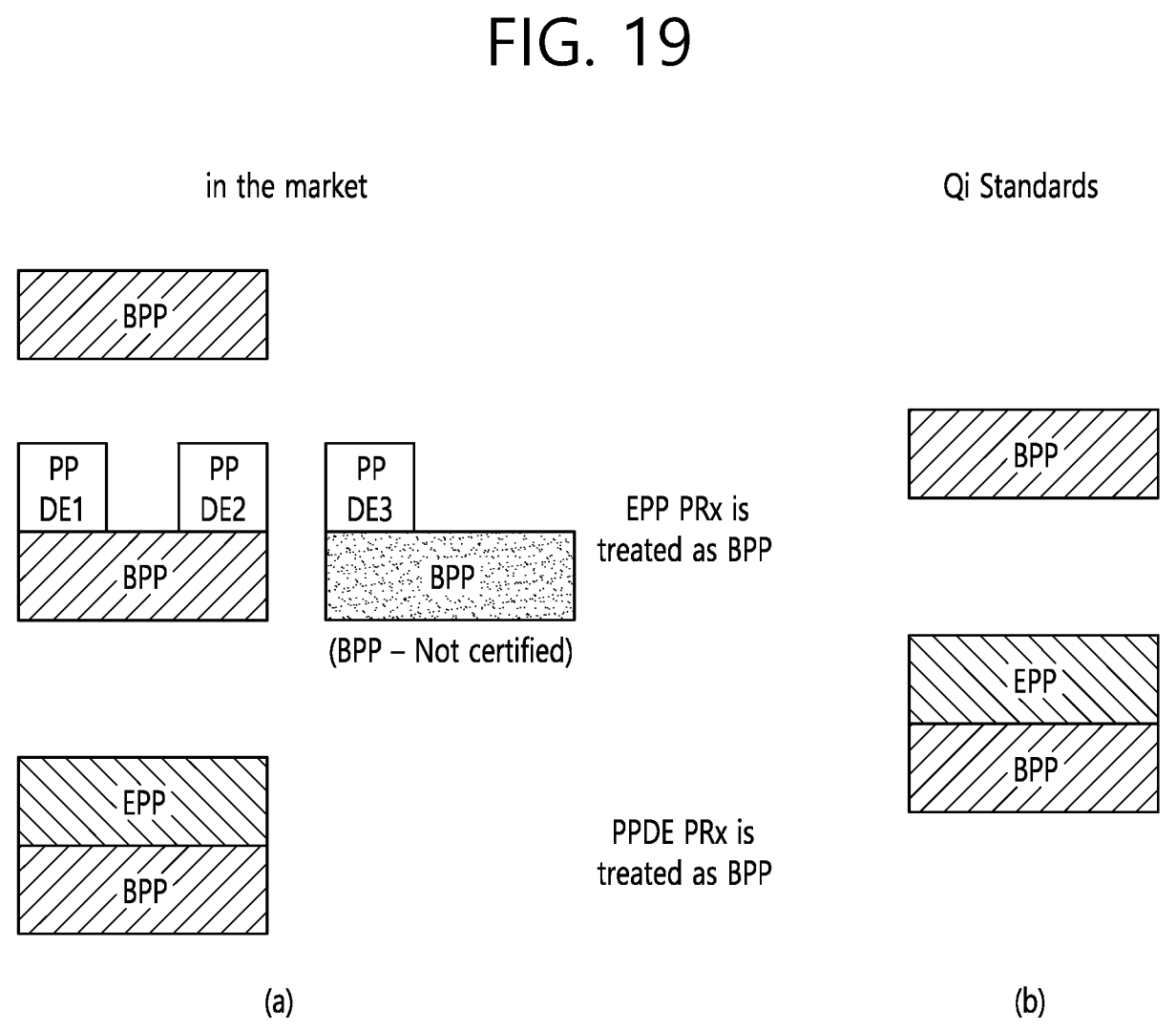

FIG. 19 is a schematic comparison of the Qi standard with power receivers on the market.

As can be seen in FIG. 19, here, the WPC Qi standard defines an extended power profile (EPP) to provide profiles for wireless power transmitters and receivers supporting power transmission in a range greater than 5 W. However, each member company in the actual market designs its own power profile for its products and provides an extension profile separate from the Qi standard, that is, a profile separate from EPP, supporting power transmission in a range greater than 5 W.

In order to understand how each member company provides power transmission, it will be described from (a) of FIG. 19. Here, (a) of FIG. 19 shows various examples of wireless power transmitters (transmitting devices)/wireless power receivers (receiving devices) currently used in the market.

First, as shown at the top of FIG. 19(*a*), there may be a wireless power transmitter that supports only BPP in the current market. In this case, even if the wireless power receiver supports EPP, only BPP-based wireless charging is possible between the wireless power transmitter supporting only BPP and the wireless power receiver supporting EPP.

As shown in the middle of FIG. 19 (*a*), a wireless power transmitter that supports BPP but supports only a manufacturer's own power profile (e.g. PPDE (Proprietary Power Delivery Extension) 1, PPDE2) instead of EPP may exist in the market. Alternatively, there may be wireless power transmitters on the market that only support not certified BPP and manufacturer-specific power profiles (e.g. PPDE3).

In this case, when the wireless power transmitter performs wireless power transmission to the EPP wireless power receiver, the wireless power transmitter treats the EPP wireless power receiver as a BPP wireless power receiver and performs wireless power transmission.

Meanwhile, a wireless power transmitter supporting only a manufacturer's own power profile (e.g. PPDE (Proprietary Power Delivery Extension) 1, PPDE2) can transmit wireless power to a wireless power receiver supporting its own unique power profile. In this case, based on a PPDE commonly supported by each other (i.e., a wireless power transmitter and a wireless power receiver), that is, based on a fast charging method commonly supported by each other, the wireless power transmitter may provide fast power charging to the wireless power receiver.

As shown in the lower part of (a) of FIG. 19, a wireless power transmitter supporting both BPP and EPP may exist in the market.

Here, when the above wireless power transmitter (i.e., a wireless power transmitter supporting both BPP and EPP) does not support EPP but performs wireless power transmission with a wireless power receiver that supports only the manufacturer's own protocol (e.g. PPDE), at this time, the wireless power transmitter may perform wireless power transmission by treating the PPDE wireless power receiver as a BPP wireless power receiver.

(b) of FIG. 19 schematically illustrates a form of a wireless power transmitter (and/or receiver) in the current Qi standard.

As described above, in the current Qi standard, a wireless power transmitter (and/or receiver) supporting BPP and a wireless power transmitter (and/or receiver) supporting both BPP and EPP may be provided. More specific details of the wireless power transmitter and receiver in the current Qi standard are as described above. Therefore, in order to avoid repetitive description of redundant content, description of specific content will be omitted.

Figure 20:
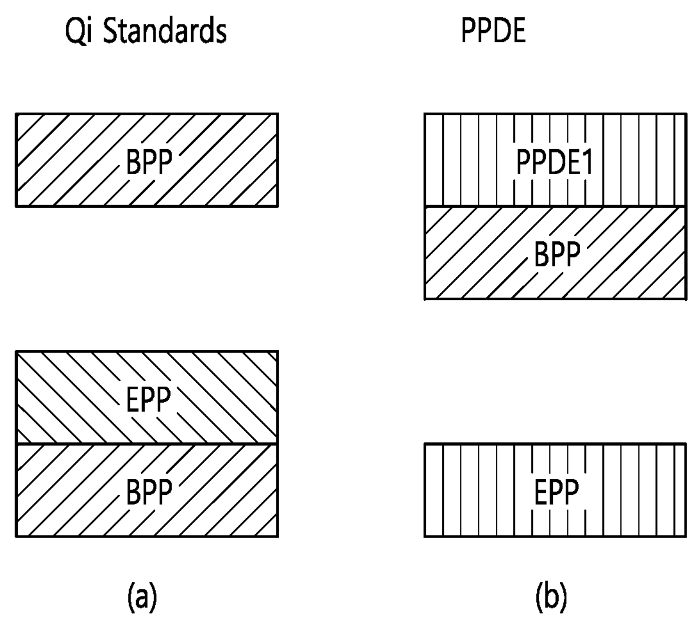
FIG. 20 summarizes examples of the Qi standard and PPDE once again.

FIG. 20 summarizes examples of the Qi standard and PPDE once again.

(a) of FIG. 20 repeats the example previously described in FIG. 19 (*b*). Accordingly, the description of (a) of FIG. 20 will be omitted below in order to prevent repetition of unnecessary content. Therefore, examples of the PPDE will be described again below through (b) of FIG. 20.

As shown at the top of (b) of FIG. 20, the PPDEs may be disposed on, for example, the skeleton of the BPP. This meaning may mean that operations according to the specifications of the Qi standard up to BPP are performed, but wireless charging is performed based on PPDE corresponding to an independent standard instead of EPP.

In addition, as shown in the lower part of (b) of FIG. 20, supporting only EPP without supporting BPP can also be said to correspond to a kind of PPDE.

As described above, the exclusive profiles of each member company may be partially compatible with the Qi standard, but the exclusive profiles of the member companies are not entirely compatible with the Qi standard.

That is, manufacturers design their own separate profiles to provide wireless charging, and as a result, products of each member company may not be compatible with products that have obtained standard certification, or compatibility may be deteriorated. In addition, problems such as generation of heat during wireless charging and inability to detect foreign substances may occur due to deterioration in compatibility.

Accordingly, in order to prevent member company-specific profiles, that is, manufacturer-specific profiles (e.g. PPDE) from being scattered separately from the Qi standard, the present specification intends to provide a method for reflecting the exclusive profile of each member company in the standard and a device therefor.

The following drawings are made to explain a specific example of the present specification. Since the names of specific devices or names of specific signals/messages/fields described in the drawings are provided as examples, the technical features of the present specification are not limited to the specific names used in the drawings below.

FIG. 21 is an example of a conceptual diagram for reflecting a member company-specific profile (e.g., PPDE) to be provided in the present specification to the Qi standard.

(a) of FIG. 21 schematically illustrates the concept of how to treat the EPP and the PPDEs of each member company on the same line (i.e., EPP as an option), which has been dealt with in the Qi standard, on the framework of BPP.

According to this example, the current EPP can be treated as a kind of PPDE. In this case, the wireless power transmitter and/or wireless power receiver proceeds with a common protocol until BPP, depending on the support capability of the wireless power transmitter and/or wireless power receiver, they perform wireless power transmission based on EPP (ie, PPDE0) as an extension protocol, or they perform wireless power transfer based on PPDE1, or they perform wireless power transfer based on PPDE2, or they can perform wireless power transmission based on PPDE 3.

On the other hand, according to this example, when each manufacturer performs wireless charging, there is an advantage that wireless charging can be performed based on a technology trusted by each manufacturer without applying the calibration technology provided by the EPP technology.

Additionally, according to this example, none of the mandatory/optional configurations in EPP including negotiation as well as calibration techniques may be applied.

In addition, according to this example, after entering the profile from BPP to PPDE, based on foreign object detection, power correction, communication technology, authentication, etc. that manufacturers trust, additional functions including high-speed charging of 15 W or more and separate OB communication other than IB can be performed. That is, according to this example, additional functions not used in EPP can be performed.

(b) of FIG. 21 schematically illustrates the concept of a method of handling PPDEs of each member company on the same line on the framework of BPP and EPP.

According to an example at this time, the wireless power transmitter and/or wireless power receiver proceeds with a common protocol up to BPP and EPP, and then, depending on the support capability of the wireless power transmitter and/or wireless power receiver, they perform wireless power transmission based on PPDE1 as an extension protocol, or they perform wireless power transfer based on PPDE2, or they can perform wireless power transmission based on PPDE 3.

Here, according to this example, since additional PPDE technology is provided in addition to the EPP technology supporting high power charging, it may be advantageous for manufacturers to charge with relatively high power.

According to this example, in addition to the EPP technology, a manufacturer's own technology can be applied using a Prop in additional negotiation. For example, it is possible to apply information transmission and communication technology for separate communication including OB in addition to IB, unique FOD technology, separate authentication technology, fast power control, clock technology, and the like. Accordingly, relatively high power and stable power transmission, temperature control, and/or foreign object detection may be enabled.

Summarizing the contents described above, in the present specification, PPDE (Proprietary Power Delivery Extension) is accepted in the Qi Standard to solve the existing compatibility problem.

In the present specification, it is intended to provide a configuration in which charging is performed in an independent profile by branching a power delivery extension (PDE) like EPP/BPP.

To this end, the present specification intends to propose a method for branching from BPP to EPP/PDE1/PDE2/ . . . /PDEn. In addition to this, the present specification also intends to provide a method for branching from EPP to PDE1/PDE2/ . . . /PDEn in an embodiment.

For example, when branching to the PPDE based on the EPP upper level, the wireless charging receiver may send GRQ/pde in the negotiation phase to check the PDE supported by the wireless charging transmitter. Thereafter, the wireless power receiver sends SRQ/pde, selects whether or not PDE is supported, and confirms this in the transmitter to end negotiation, thereby branching to PDE. That is, after checking with GRQ/pde→PDE can be selected with SRQ/pde.

The following drawings are made to explain a specific example of the present specification. Since the names of specific devices or names of specific signals/messages/fields described in the drawings are provided as examples, the technical features of the present specification are not limited to the specific names used in the drawings below.

FIG. 22 is a flowchart of a method of transmitting support information in a wireless power transmission system according to an embodiment of the present specification.

According to FIG. 22, the wireless power receiver may enter a configuration phase with the wireless power transmitter (S2210). Here, since the specific examples for this are the same as those described above (and/or will be described later), descriptions of overlapping contents will be omitted in order to omit unnecessary repetition.

The wireless power receiver may transmit the support information to the wireless power transmitter in the configuration phase (S2220). Here, since the specific examples for this are the same as those described above (and/or will be described later), descriptions of overlapping contents will be omitted in order to omit unnecessary repetition.

Here, the support information may include information related to a power transfer protocol supported by the wireless power receiver. Here, since the specific examples for this are the same as those described above (and/or will be described later), descriptions of overlapping contents will be omitted in order to omit unnecessary repetition.

For example, the support information may be a configuration (CFG) packet, an identification (ID) packet, or an extended identification (XID) packet. Here, since the specific examples for this are the same as those described above (and/or will be described later), descriptions of overlapping contents will be omitted in order to omit unnecessary repetition.

For example, the information related to the power transfer protocol may include at least one of identification information of the power transfer protocol or information on whether or not the power transfer protocol is supported. Here, since the specific examples for this are the same as those described above (and/or will be described later), descriptions of overlapping contents will be omitted in order to omit unnecessary repetition.

For example, after transmitting the support information, the wireless power receiver may receive response information from the wireless power transmitter in the configuration phase. Here, since the specific examples for this are the same as those described above (and/or will be described later), descriptions of overlapping contents will be omitted in order to omit unnecessary repetition.

For example, the response information is information indicating that the wireless power transmitter also supports the power transfer protocol, the wireless power receiver may receive wireless power from the wireless power transmitter in a power transfer phase based on the power transfer protocol. Here, since the specific examples for this are the same as those described above (and/or will be described later), descriptions of overlapping contents will be omitted in order to omit unnecessary repetition.

For example, the response information is ACK, and the wireless power receiver may receive wireless power from the wireless power transmitter in a power transfer phase based on an extended power profile (EPP). Here, since the specific examples for this are the same as those described above (and/or will be described later), descriptions of overlapping contents will be omitted in order to omit unnecessary repetition.

For example, based on not receiving response information from the wireless power transmitter, the wireless power receiver may receive wireless power from the wireless power transmitter in a power transfer phase based on a baseline power profile (BPP). Here, since the specific examples for this are the same as those described above (and/or will be described later), descriptions of overlapping contents will be omitted in order to omit unnecessary repetition.

For example, the power delivery protocol may be Power Delivery Extension (PDE). Here, since the specific examples for this are the same as those described above (and/or will be described later), descriptions of overlapping contents will be omitted in order to omit unnecessary repetition.

For example, the PDE may be an extended power profile (EPP) or a proprietary power delivery extension (PPDE). Here, since the specific examples for this are the same as those described above (and/or will be described later), descriptions of overlapping contents will be omitted in order to omit unnecessary repetition.

Figure 23:
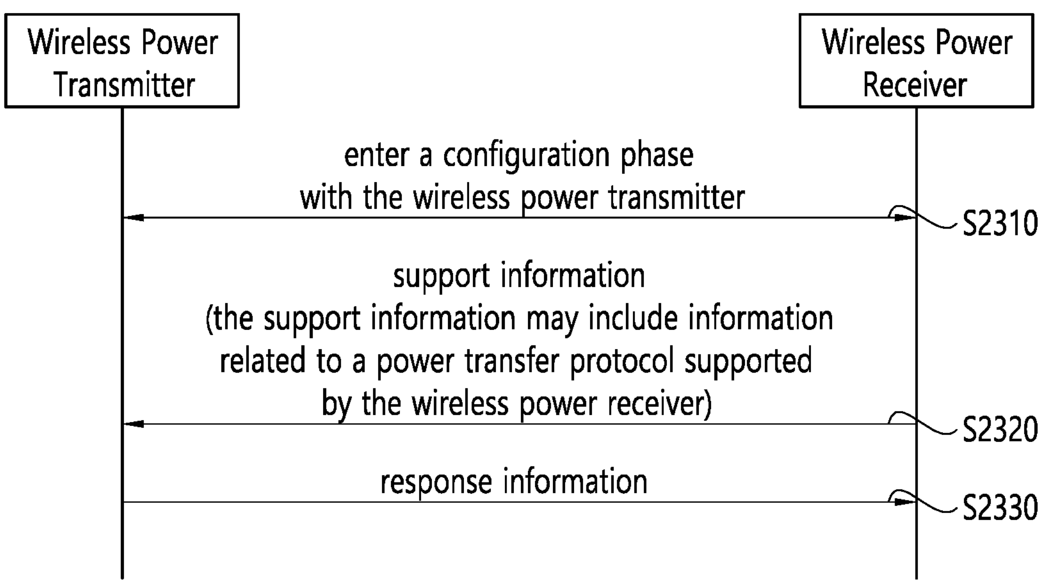
FIG. 23 is a flowchart of a method of transmitting support information in a wireless power transmission system according to another embodiment of the present specification.

FIG. 23 is a flowchart of a method of transmitting support information in a wireless power transmission system according to another embodiment of the present specification.

According to FIG. 23, the wireless power receiver may enter a configuration phase with the wireless power transmitter (S2310). Here, since the specific examples for this are the same as those described above (and/or will be described later), descriptions of overlapping contents will be omitted in order to omit unnecessary repetition.

The wireless power receiver may transmit the support information to the wireless power transmitter in the configuration phase (S2320). Here, since the specific examples for this are the same as those described above (and/or will be described later), descriptions of overlapping contents will be omitted in order to omit unnecessary repetition.

Here, the support information may include information related to a power transfer protocol supported by the wireless power receiver. Here, since the specific examples for this are the same as those described above (and/or will be described later), descriptions of overlapping contents will be omitted in order to omit unnecessary repetition.

Meanwhile, the wireless power receiver may receive response information from the wireless power transmitter (S2330). Here, since the specific examples for this are the same as those described above (and/or will be described later), descriptions of overlapping contents will be omitted in order to omit unnecessary repetition.

Figure 24:
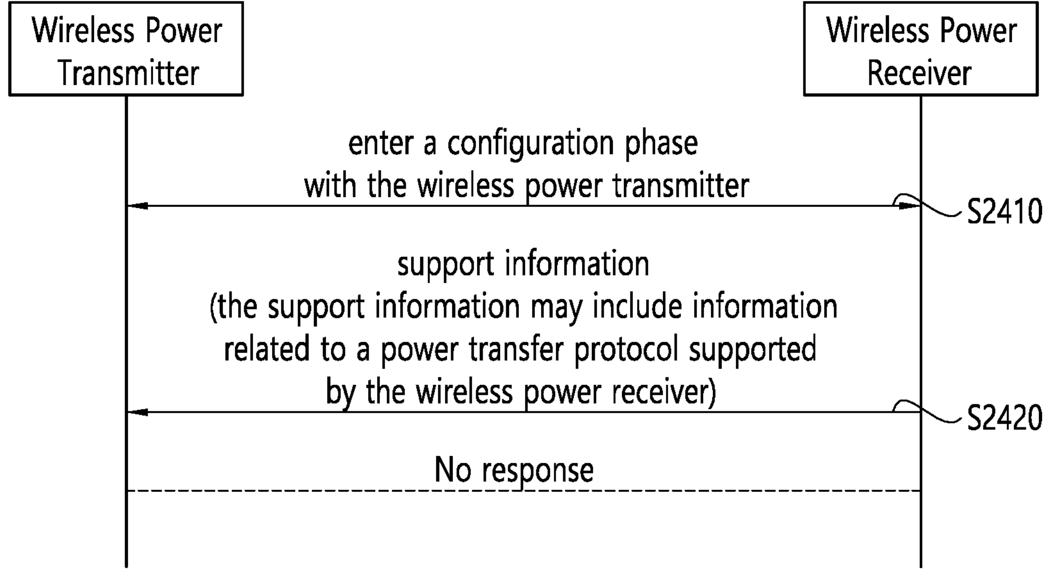
FIG. 24 is a flowchart of a method of transmitting support information in a wireless power transfer system according to another embodiment of the present specification.

FIG. 24 is a flowchart of a method of transmitting support information in a wireless power transfer system according to another embodiment of the present specification.

According to FIG. 24, the wireless power receiver may enter a configuration phase with the wireless power transmitter (S2410). Here, since the specific examples for this are the same as those described above (and/or will be described later), descriptions of overlapping contents will be omitted in order to omit unnecessary repetition.

The wireless power receiver may transmit the support information to the wireless power transmitter in the configuration phase (S2420). Here, since the specific examples for this are the same as those described above (and/or will be described later), descriptions of overlapping contents will be omitted in order to omit unnecessary repetition.

Here, the support information may include information related to a power transfer protocol supported by the wireless power receiver. Here, since the specific examples for this are the same as those described above (and/or will be described later), descriptions of overlapping contents will be omitted in order to omit unnecessary repetition.

Meanwhile, the wireless power receiver may not be able to receive a separate response from the wireless power transmitter. In this case, based on not receiving response information from the wireless power transmitter, the wireless power receiver can receive wireless power from the wireless power transmitter in a power transfer phase based on a baseline power profile (BPP). Here, since the specific examples for this are the same as those described above (and/or will be described later), descriptions of overlapping contents will be omitted in order to omit unnecessary repetition.

Hereinafter, for better understanding of the embodiments provided in the present specification, information related to a power transfer protocol supported by a wireless power receiver will be transmitted through which packet will be described in more detail.

First of all, the state diagram in the configuration phase will be explained through drawings.

Figure 25:
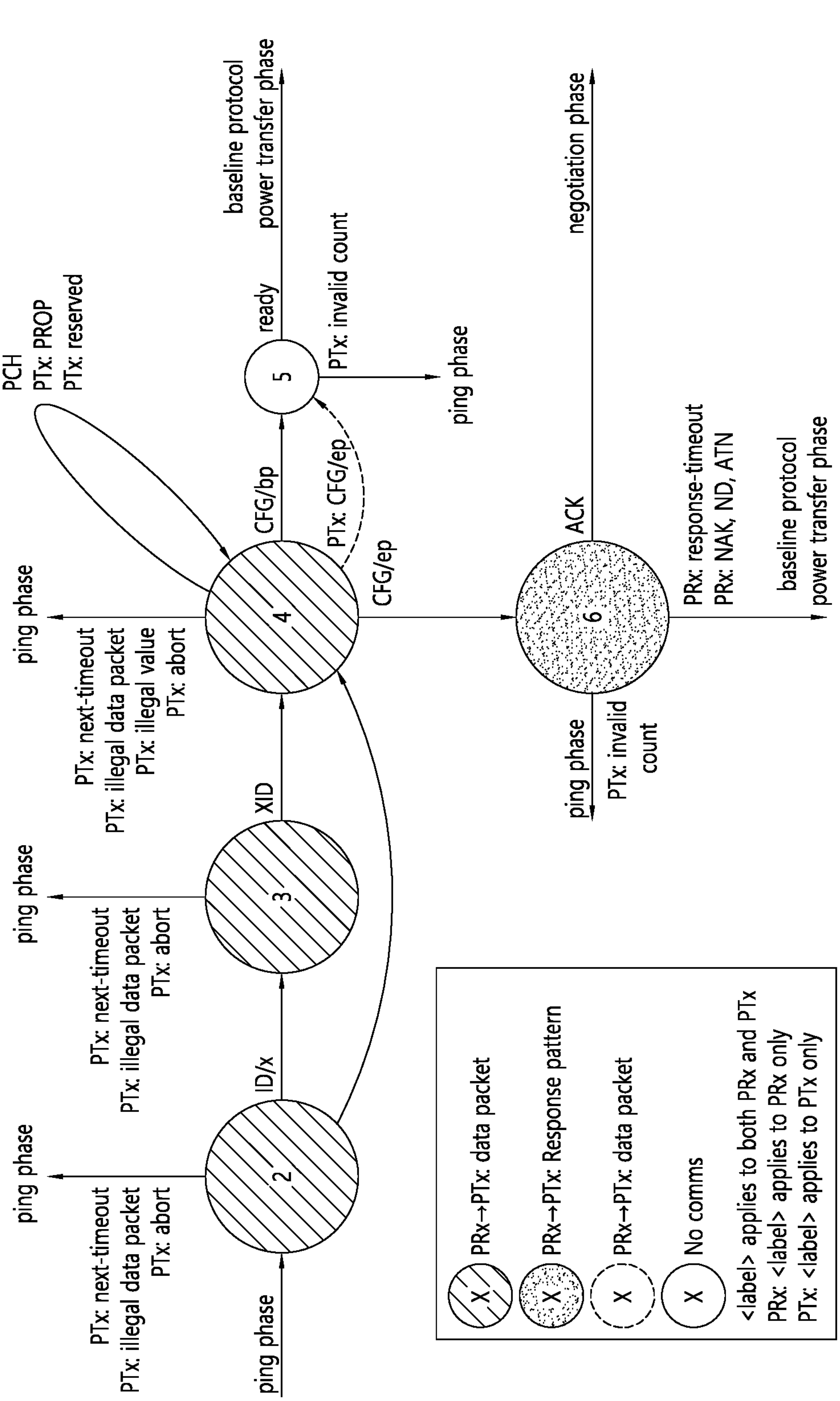
FIG. 25 schematically shows a state diagram in the configuration phase.

FIG. 25 schematically shows a state diagram in the configuration phase.

According to FIG. 25, after the ping phase, state 2 may be entered. At this time, in state 2, the ID may be transmitted from the wireless power receiver to the wireless power transmitter.

After state 2, state 3 can be entered. At this time, in state 3, the XID may be transmitted from the wireless power receiver to the wireless power transmitter.

After state 3, state 4 can be entered. At this time, in state 4, the CFG may be transmitted from the wireless power receiver to the wireless power transmitter.

Under the above background, a method for transmitting information related to a power transfer protocol supported by a wireless power receiver in each state will be described in more detail.

Figure 26:
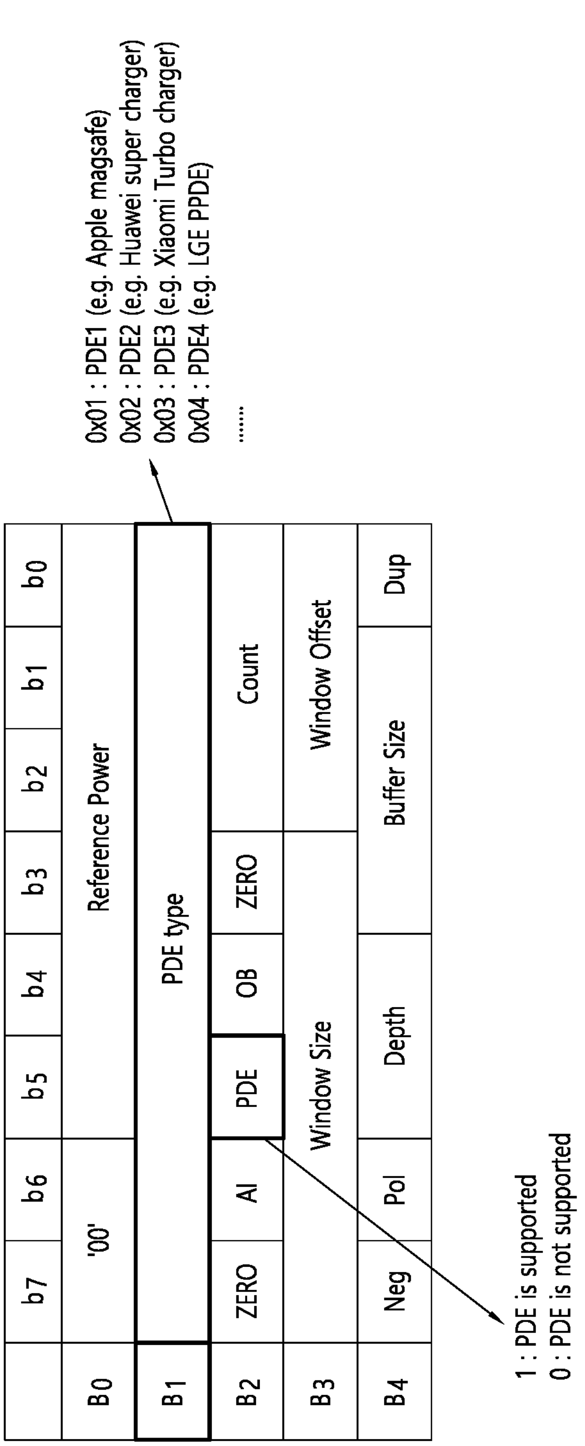
FIG. 26 schematically illustrates an example of a CFG packet when information related to a power transfer protocol supported by a wireless power receiver is transmitted through the CFG packet.

FIG. 26 schematically illustrates an example of a CFG packet when information related to a power transfer protocol supported by a wireless power receiver is transmitted through the CFG packet.

According to FIG. 26, from State 1→State 2→State 3, PPDE and Qi standards (BPP and/or EPP) may proceed in the same way.

Here, the packet transmitted in state 4 is a configuration data packet transmitted from the wireless power receiver to the wireless power transmitter, based on the ‘Neg’ bit in the configuration data packet, the wireless power transmitter determines whether the wireless power receiver supports EPP.

Meanwhile, according to an embodiment of the present specification, information related to a power transfer protocol supported by a wireless power receiver may be transmitted through a CFG packet. Information related to the power transfer protocol at this time may include, for example, ‘PDE’ bits and/or ‘PDE type’ information.

Here, the wireless power transmitter can determine whether the wireless power receiver supports a specific PDE by looking at the PDE bit and the PDE type of the CFG packet sent by the wireless power receiver. In other words, after the wireless power receiver selects a PDE it supports, by transmitting the selected information to the wireless power transmitter through a CFG packet, the wireless power receiver can inform the wireless power transmitter of its intention to proceed to the PDE.

If the wireless power transmitter supports the PDE notified by the wireless power receiver, the wireless power transmitter sends a separately defined response pattern (e.g. 0x77) to the wireless power receiver, so that the PDE can proceed between the wireless power transmitter and the wireless power receiver.

If the wireless power transmitter does not support the PDE notified by the wireless power receiver, the wireless power transmitter may proceed with BPP by not responding to the wireless power receiver, alternatively, the wireless power transmitter may proceed with the EPP by responding an ACK to the wireless power receiver. In this way, the wireless power transmitter may proceed with charging according to the existing Qi standard profile through no response and/or ACK.

Here, as shown in FIG. 26, the CFG packet may include information about the PDE type (e.g. ‘PDE type’) and information about whether or not the PDE is supported (e.g. ‘PDE’). In this case, information on the PDE type and information on whether or not the PDE is supported may be located in reserved bits in the legacy CFG packet.

Information on the PDE type may be configured as follows, for example, “0x01, i.e. PDE1 (e.g. Apple magsafe), 0x02, i.e. PDE2 (e.g. Huawei super charger), 0x03, i.e. PDE3 (e.g. Xiaomi Turbo charger), 0x04, i.e. PDE4 (e.g. LGE PPDE), etc. The example at this time is only for convenience of description, and the embodiments of the present specification are not limited to the above example.

Information on whether PDE is supported may be composed of, for example, ‘0’ or ‘1’. As an example, ‘1’ may be information indicating that PDE is supported, ‘0’ may be information indicating that PDE is not supported. Meanwhile, depending on implementation, ‘0’ may be information indicating that PDE is supported, ‘1’ may be information indicating that PDE is not supported.

In summary, if the PDE bit of the CFG packet is ONE, it may mean that the wireless power receiver supports the PDE specified in the PDE type. In addition, when the PDE bit of the CFG packet is ZERO, it may mean that PDE is not supported. Here, when the PDE bit is ONE, the wireless power transmitter and/or the wireless power receiver may determine the PDE type of B1 and proceed with the protocol according to the PDE profile recognized as the Qi standard.

Meanwhile, in the present specification and drawings, an example including, for example, ‘PDE’ bits and ‘PDE type’ information is described in a CFG packet, but this is only an example for understanding the present specification. Accordingly, the present specification also provides an example of including, for example, only ‘PDE type’ information in a CFG packet, and the PDE type information in this case may be information indicating a PDE type supported by the wireless power receiver. That is, when there is only information indicating the PDE type in the CFG packet, the information indicating the PDE type at this time may mean that the wireless power receiver necessarily supports the PDE type.

Figure 27:
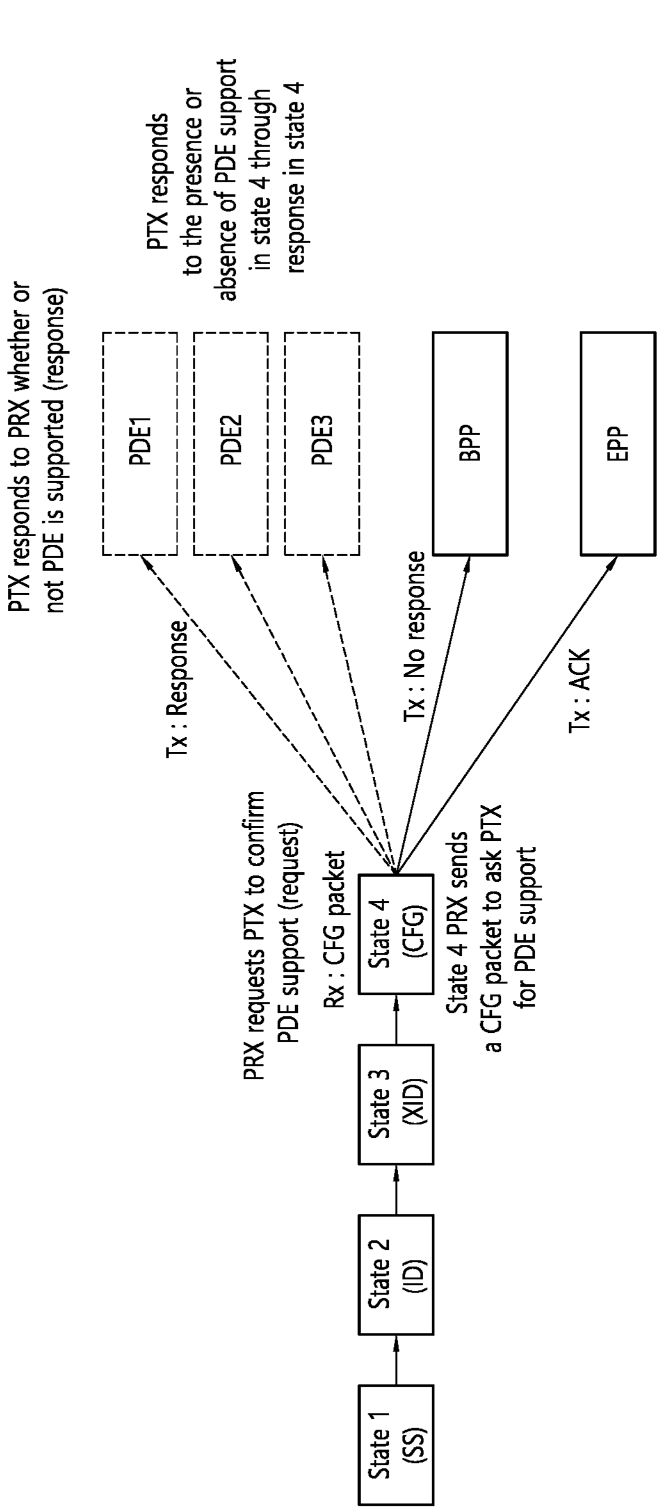
FIG. 27 illustrates an example of when information related to a power transfer protocol supported by a wireless power receiver is transmitted through a CFG packet in another form.

FIG. 27 illustrates an example of when information related to a power transfer protocol supported by a wireless power receiver is transmitted through a CFG packet in another form.

According to FIG. 27, state 1 (SS), state 2 (ID), and state 3 (XID) may be performed in the same manner as the existing procedure.

Then, in state 4 (CFG), the wireless power receiver may transmit information related to a power transfer protocol supported by the wireless power receiver through the aforementioned CFG packet. In other words, the wireless power receiver may make a request to the wireless power transmitter to confirm PDE support. That is, the wireless power receiver may request the wireless power transmitter to check whether the wireless power transmitter supports a PDE supported by the wireless power receiver itself. As another expression, the wireless power receiver in state 4 may send a CFG packet to the wireless power transmitter and request the wireless power transmitter to check whether PDE is supported.

Here, wireless power transmission may be performed between the wireless power transmitter and the wireless power receiver through different power transfer protocols according to response information of the wireless power transmitter.

For example, the wireless power transmitter may transmit response information, that is, the wireless power transmitter may respond to the wireless power receiver whether or not a PDE (supported by the wireless power receiver) is supported (the wireless power transmitter itself). In other words, the wireless power transmitter may perform a response regarding the presence or absence of PDE support progressed in state 4 through the response in state 4. In this case, the wireless power transmitter and the wireless power receiver may perform wireless power transmission through a PDE (e.g. PDE1, PDE2, PDE3, etc.) supported between them.

For example, the wireless power transmitter may not transmit response information. That is, the wireless power transmitter may not respond to the confirmation request. In this case, the wireless power transmitter and the wireless power receiver may perform wireless power transmission through BPP.

For example, the wireless power transmitter may transmit an ACK. That is, the wireless power transmitter may transmit ACK in response to the confirmation request. In this case, the wireless power transmitter and the wireless power receiver may perform wireless power transmission through EPP.

FIG. 27 will be reorganized and explained as follows. This figure shows that the wireless power transmitter branches the charging protocol by looking at the support request profile (e.g., BPP/EPP/PDEn) of the wireless power receiver. Here, when the PDE bit of the CFG packet is ONE, it means that the wireless power receiver supports the PDE specified in the PDE type. In addition, when the PDE bit of the CFG packet is ZERO, PDE may not be supported. Meanwhile, when the PDE bit is ONE, after determining the PDE type of the B1 field of the CFG packet, wireless charging may proceed according to the PDE profile recognized as the Qi standard.

Additionally, for example, a wireless power transmitter may perform a unique response to PDE assistance. That is, the wireless power transmitter responds to the confirmation request of PDE1 with 0x77 (an example of a unique response supporting PDE1), in this case, the wireless power transmitter and the wireless power receiver may perform wireless power transmission through PDE1.

Here, according to the method for confirming the presence or absence of support in state 4 (CFG) as shown in FIG. 27, since the point of divergence from the existing BPP to EPP and the point of divergence to PDE proposed in this specification are the same, there may be an advantage that states 1 to 3 are used the same as BPP.

In addition, since the point of divergence of the protocol is the same, it may be advantageous in terms of backward compatibility with existing products supporting Qi.

Figure 28:
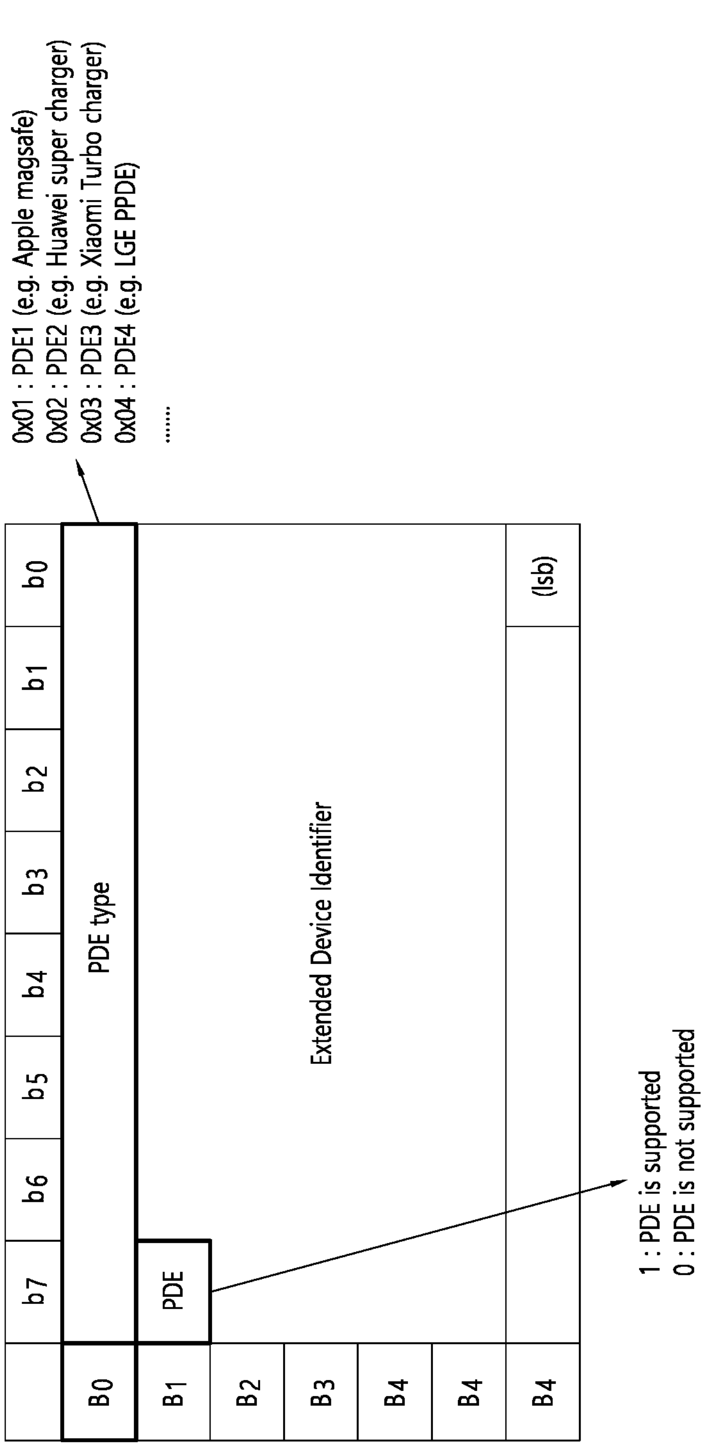
FIG. 28 schematically illustrates an example of an XID packet when information related to a power transfer protocol supported by a wireless power receiver is transmitted through the XID packet.

FIG. 28 schematically illustrates an example of an XID packet when information related to a power transfer protocol supported by a wireless power receiver is transmitted through the XID packet.

According to FIG. 28, from State 1→State 2→State 3, PPDE and Qi standards (BPP and/or EPP) may proceed in the same way.

Here, the packet transmitted in state 3 may be an extended identification packet (XID) packet transmitted from the wireless power receiver to the wireless power transmitter.

Meanwhile, according to an embodiment of the present specification, information related to a power transfer protocol supported by a wireless power receiver may be transmitted through an XID packet. Information related to the power transfer protocol at this time may include, for example, 'PDE' bits and/or 'PDE type' information. That is, each PDE can be distinguished by the data content of the above XID.

Here, the wireless power transmitter can determine whether the wireless power receiver supports a specific PDE by looking at the PDE bit and the PDE type of the XID packet sent by the wireless power receiver. In other words, after the wireless power receiver selects a PDE it supports, by transmitting the selected information to the wireless power transmitter through an XID packet, the wireless power receiver may inform the wireless power transmitter of an intention to proceed with the PDE.

If the wireless power transmitter supports the PDE notified by the wireless power receiver, the wireless power transmitter sends a separately defined CFG packet response pattern (e.g. 0x77) to the wireless power receiver, a PDE may be performed between the wireless power transmitter and the wireless power receiver.

The response sent by the wireless charging transmitter may be the same for each PDE type, but the response may be different.

For example, when PDE1 is 0x01 and 'Apple magsafe', when PDE4 is 0x04 and LGE PPDE, there may be a case of 0x77 in response to PDE support (both Apple magsafe and LG PPDE). In addition, in the case of 'Apple magsafe', the response is 0x77, but in the case of LGE PPDE, the response is 0x88, and the FSK response of the transmitter for each PDE may be different. That is, responses sent by the wireless power transmitter for each PDE type may be the same or different.

If the wireless power transmitter does not support the PDE notified by the wireless power receiver, the wireless power transmitter may proceed with BPP by not responding to the wireless power receiver, alternatively, the wireless power transmitter may proceed with the EPP by responding an ACK to the wireless power receiver. As such, the wireless power transmitter may perform charging according to the existing Qi standard profile through non-response and/or ACK.

Here, as shown in FIG. 28, the XID packet may include information about the PDE type (e.g. 'PDE type') and information about whether or not the PDE is supported (e.g. 'PDE'). In this case, information on the PDE type and information on whether or not the PDE is supported may be located in a reserved bit in the legacy XID packet.

Information on the PDE type may be configured as, for example, 0x01, i.e. PDE1 (e.g. Apple magsafe), 0x02, i.e. PDE2 (e.g. Huawei super charger), 0x03, i.e. PDE3 (e.g. Xiaomi Turbo charger), 0x04, i.e. PDE4 (e.g. LGE PPDE), etc. The example at this time is only for convenience of description, and the embodiments of the present specification are not limited to the above example.

Information on whether PDE is supported may be composed of, for example, '0' or '1'. As an example, '1' may be information indicating that PDE is supported, '0' may be information indicating that PDE is not supported. Meanwhile, depending on implementation, '0' may be information indicating that PDE is supported, '1' may be information indicating that PDE is not supported.

In summary, if the PDE bit of the XID packet is ONE, it may mean that the wireless power receiver supports the PDE specified in the PDE type. In addition, when the PDE bit of the XID packet is ZERO, it may mean that PDE is not supported. Here, when the PDE bit is ONE, the wireless power transmitter and/or the wireless power receiver may determine the PDE type of B1 and proceed with the protocol according to the PDE profile recognized as the Qi standard.

Meanwhile, in the present specification and drawings, an example of including, for example, 'PDE' bits and 'PDE type' information in an XID packet is described, but this is only an example for understanding the present specification. Accordingly, the present specification also provides an example of including, for example, only 'PDE type' information in an XID packet, the PDE type information at this time may be information indicating a PDE type supported by the wireless power receiver. That is, when there is only information indicating the PDE type in the XID packet, the information indicating the PDE type at this time may mean that the wireless power receiver necessarily supports the above PDE type.

Figure 29:
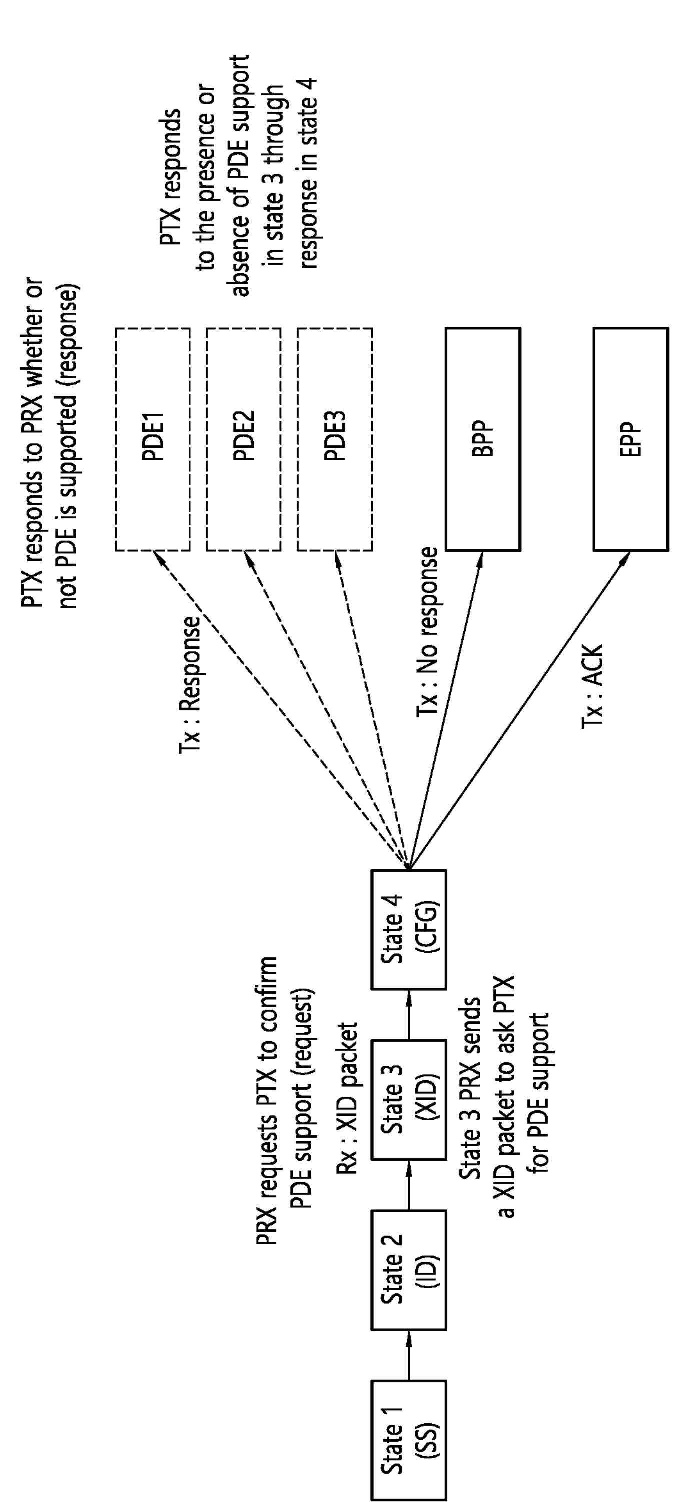
FIG. 29 illustrates an example of when information related to a power transfer protocol supported by a wireless power receiver is transmitted through an XID packet in another form.

FIG. 29 illustrates an example of when information related to a power transfer protocol supported by a wireless power receiver is transmitted through an XID packet in another form.

According to FIG. 29, state 1 (SS) and state 2 (ID) may be performed in the same way as the existing procedure.

Then, in state 3 (XID), the wireless power receiver may transmit information related to a power transfer protocol supported by the wireless power receiver through the aforementioned XID packet. In other words, the wireless power receiver may make a request to the wireless power transmitter to confirm PDE support. That is, the wireless power receiver may request the wireless power transmitter to check whether the wireless power transmitter supports a PDE supported by the wireless power receiver itself. As another expression, the wireless power receiver in state 3 may send an XID packet to the wireless power transmitter and request the wireless power transmitter to check whether PDE is supported.

Here, wireless power transmission may be performed between the wireless power transmitter and the wireless power receiver through different power transfer protocols according to response information of the wireless power transmitter.

For example, the wireless power transmitter may transmit response information, that is, the wireless power transmitter may respond to the wireless power receiver whether or not a PDE (supported by the wireless power receiver) is supported (the wireless power transmitter itself). In other words, the wireless power transmitter may perform a response to the confirmation request for the presence or absence of PDE support progressed in state 3 through the response in state 4. In this case, the wireless power transmitter and the wireless power receiver may perform wireless power transmission through a PDE (e.g. PDE1, PDE2, PDE3, etc.) supported between them.

For example, the wireless power transmitter may not transmit response information. That is, the wireless power transmitter may not respond to the confirmation request. In this case, the wireless power transmitter and the wireless power receiver may perform wireless power transmission through BPP.

For example, the wireless power transmitter may transmit an ACK. That is, the wireless power transmitter may transmit ACK in response to the confirmation request. In this case, the wireless power transmitter and the wireless power receiver may perform wireless power transmission through EPP.

FIG. 29 will be reorganized and explained as follows. This figure shows that the wireless power transmitter sees a support request profile (eg, BPP/EPP/PDEn) and branches a charging protocol through an XID packet sent by the wireless power receiver. Here, when the PDE bit of the XID packet is ONE, it means that the wireless power receiver supports the PDE specified in the PDE type. In addition, when the PDE bit of the XID packet is ZERO, PDE may not be supported. Meanwhile, when the PDE bit is ONE, after determining the PDE type of the B1 field of the XID packet, wireless charging may proceed according to the PDE profile recognized as the Qi standard.

Support in state 3 (XID) of FIG. 29 may have an advantage that it is easy to express various information about the PDE due to the characteristics of the XID. That is, since the definition of bits for XID is not defined in the standard, information can be expressed freely.

In addition, there may be advantages in that expression of PDE branch support, PDE type, etc. is free, and bit information of related manufacturers, product types/categories, and features can be easily expressed in XID.

In addition, since there is no PRx currently using XID, there may be no particular problem in backward compatibility with existing products.

Finally, after the PDE branch, since the PDE-specific feature bits can be used in the CFG (by utilizing the existing reserved bits), it is possible to express and check functions.

Figure 30:
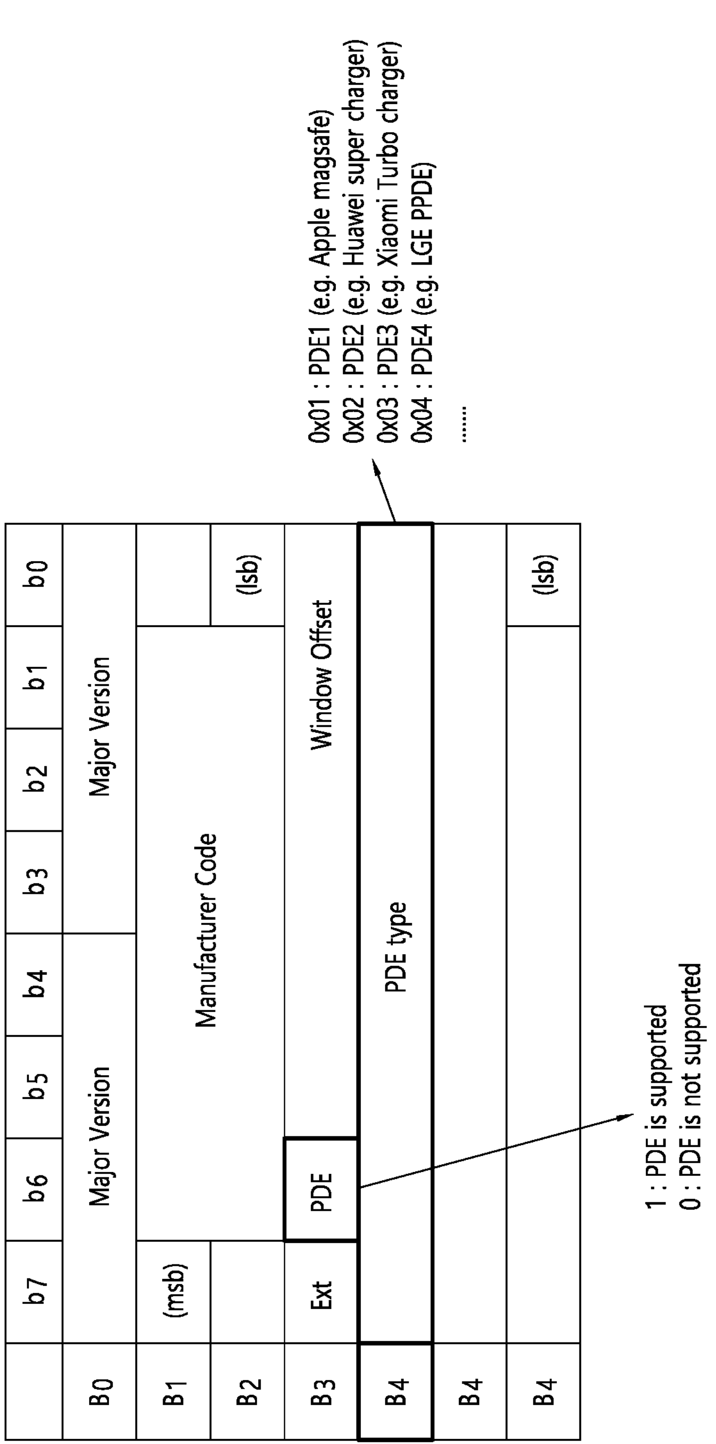
FIG. 30 schematically illustrates an example of an ID packet when information related to a power transfer protocol supported by a wireless power receiver is transmitted through the ID packet.

FIG. 30 schematically illustrates an example of an ID packet when information related to a power transfer protocol supported by a wireless power receiver is transmitted through the ID packet.

According to FIG. 30, from State 1 to State 2, PPDE and Qi standards (BPP and/or EPP) may proceed in the same way.

Here, the packet transmitted in state 2 may be an extended identification packet (ID) packet transmitted from the wireless power receiver to the wireless power transmitter.

Meanwhile, according to an embodiment of the present specification, information related to a power transfer protocol supported by a wireless power receiver may be transmitted through an ID packet. Information related to the power transfer protocol at this time may include, for example, 'PDE' bits and/or 'PDE type' information. That is, each PDE can be distinguished by the data content of the above ID.

Here, the wireless power transmitter may determine whether the wireless power receiver supports a specific PDE by looking at the PDE bit and the PDE type of the ID packet sent by the wireless power receiver. In other words, after the wireless power receiver selects a PDE it supports, by transmitting the selected information to the wireless power transmitter through an ID packet, the wireless power receiver may inform the wireless power transmitter of an intention to proceed with the PDE.

If the wireless power transmitter supports the PDE notified by the wireless power receiver, the wireless power transmitter sends a separately defined CFG packet response pattern (e.g. 0x77) to the wireless power receiver, a PDE may be performed between the wireless power transmitter and the wireless power receiver.

If the wireless power transmitter does not support the PDE notified by the wireless power receiver, the wireless power transmitter may proceed with BPP by not responding to the wireless power receiver, alternatively, the wireless power transmitter may proceed with the EPP by responding an ACK to the wireless power receiver. As such, the wireless power transmitter may perform charging according to the existing Qi standard profile through non-response and/or ACK.

Here, as shown in FIG. 30, the ID packet may include information about the PDE type (e.g. 'PDE type') and information about whether or not the PDE is supported (e.g. 'PDE'). In this case, information on the PDE type and information on whether or not the PDE is supported may be located in a reserved bit in the legacy ID packet.

Information on the PDE type may be configured as, for example, 0x01, i.e. PDE1 (e.g. Apple magsafe), 0x02, i.e. PDE2 (e.g. Huawei super charger), 0x03, i.e. PDE3 (e.g. Xiaomi Turbo charger), 0x04, i.e. PDE4 (e.g. LGE PPDE), etc. The example at this time is only for convenience of description, and the embodiments of the present specification are not limited to the above example.

Information on whether PDE is supported may be composed of, for example, '0' or '1'. For example, '1' may be information indicating that PDE is supported, and '0' may be information indicating that PDE is not supported. Meanwhile, depending on implementation, '0' may be information indicating that PDE is supported, and '1' may be information indicating that PDE is not supported.

In summary, if the PDE bit of the ID packet is ONE, it may mean that the wireless power receiver supports the PDE specified in the PDE type. In addition, when the PDE bit of the ID packet is ZERO, it may mean that PDE is not supported. Here, when the PDE bit is ONE, the wireless power transmitter and/or the wireless power receiver may determine the PDE type of B1 and proceed with the protocol according to the PDE profile recognized as the Qi standard.

Meanwhile, in the present specification and drawings, an example of including, for example, 'PDE' bits and 'PDE type' information in an ID packet is described, but this is only an example for understanding the present specification. Accordingly, the present specification also provides an example of including, for example, only 'PDE type' information in an ID packet, and the PDE type information in this case may be information indicating a PDE type supported by the wireless power receiver. That is, when there is only information indicating the PDE type in the ID packet, the information indicating the PDE type at this time may mean that the wireless power receiver necessarily supports the above PDE type.

Figure 31:
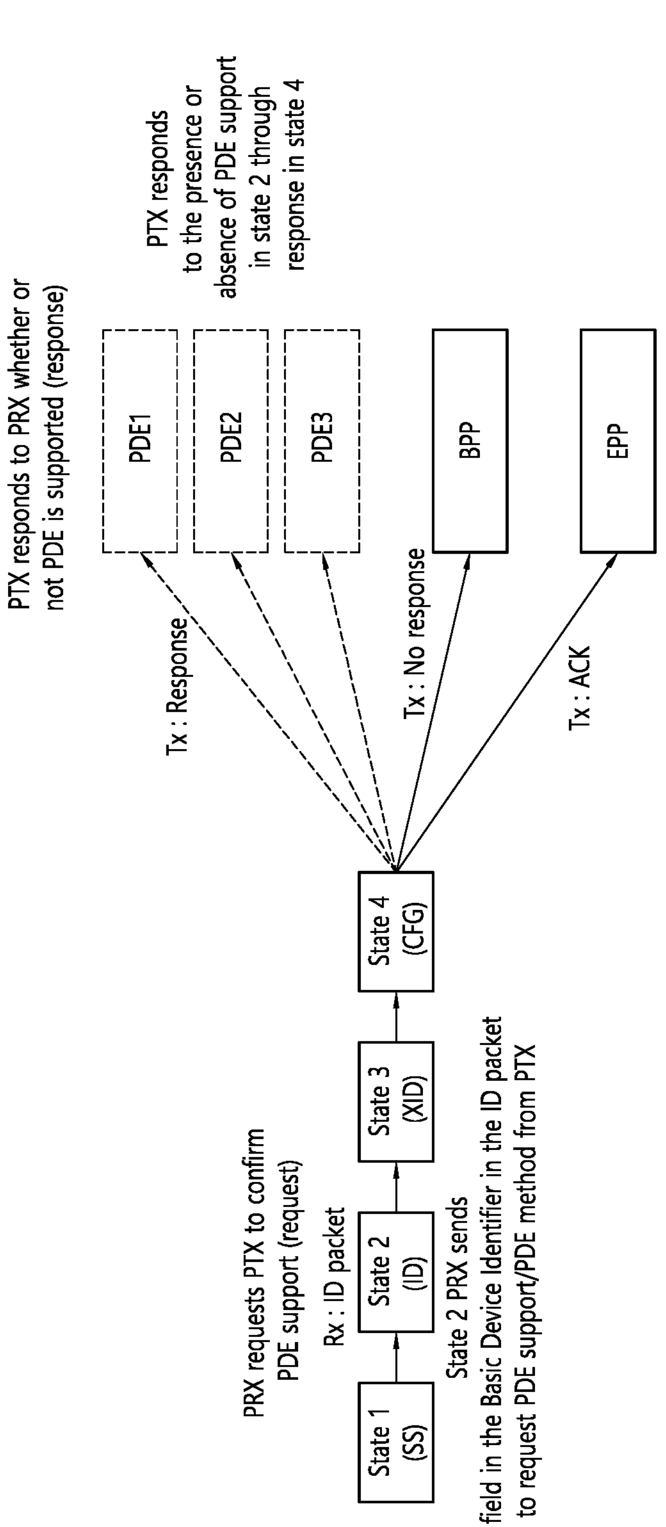
FIG. 31 illustrates another example of when information related to a power transfer protocol supported by a wireless power receiver is transmitted through an ID packet.

FIG. 31 illustrates another example of when information related to a power transfer protocol supported by a wireless power receiver is transmitted through an ID packet.

According to FIG. 31, state 1 (SS) may proceed in the same way as the existing procedure.

Then, in state 2 (ID), the wireless power receiver may transmit information related to a power transfer protocol supported by the wireless power receiver through the aforementioned ID packet. In other words, the wireless power receiver may make a request to the wireless power transmitter to confirm PDE support. That is, the wireless power receiver may request the wireless power transmitter to check whether the wireless power transmitter supports a PDE supported by the wireless power receiver itself. As another expression, the wireless power receiver in state 2 may send an ID packet to the wireless power transmitter and request the wireless power transmitter to check whether a PDE is supported.

Here, wireless power transmission may be performed between the wireless power transmitter and the wireless power receiver through different power transfer protocols according to response information of the wireless power transmitter.

For example, the wireless power transmitter may transmit response information, that is, the wireless power transmitter may respond to the wireless power receiver whether or not a PDE (supported by the wireless power receiver) is supported (the wireless power transmitter itself). In other words, the wireless power transmitter may respond to the confirmation request for whether or not PDE is supported in state 2 through the response in state 4. In this case, the wireless power transmitter and the wireless power receiver may perform wireless power transmission through a PDE (e.g. PDE1, PDE2, PDE3, etc.) supported between them.

For example, the wireless power transmitter may not transmit response information. That is, the wireless power transmitter may not respond to the confirmation request. In this case, the wireless power transmitter and the wireless power receiver may perform wireless power transmission through BPP.

For example, the wireless power transmitter may transmit an ACK. That is, the wireless power transmitter may transmit ACK in response to the confirmation request. In this case, the wireless power transmitter and the wireless power receiver may perform wireless power transmission through EPP.

FIG. 31 will be reorganized and explained as follows. This figure shows that a wireless power transmitter branches a charging protocol by looking at a support request profile (eg, BPP/EPP/PDEn) through an ID packet sent by a wireless power receiver. Here, when the PDE bit of the ID packet is ONE, it means that the wireless power receiver supports the PDE specified in the PDE type. In addition, when the PDE bit of the ID packet is ZERO, PDE may not be supported. Meanwhile, when the PDE bit is ONE, after determining the PDE type of the B1 field of the ID packet, wireless charging may proceed according to the PDE profile recognized as the Qi standard.

Support in state 2 (ID) of FIG. 31 may have an advantage of being able to simultaneously check the Qi version, manufacturer code, and PDE presence.

Here, after the manufacturer PDE branch in the ID, the XID can be used to additionally utilize manufacturer-specific bits and feature bits, so there may be an advantage that function expression, manufacturer, and product type/category can be additionally confirmed.

In addition, since PDE-specific feature bits can be used in the CFG (using existing reserved bits) after the PDE branch, there may be an advantage that function expression and confirmation are possible.

Figure 32:
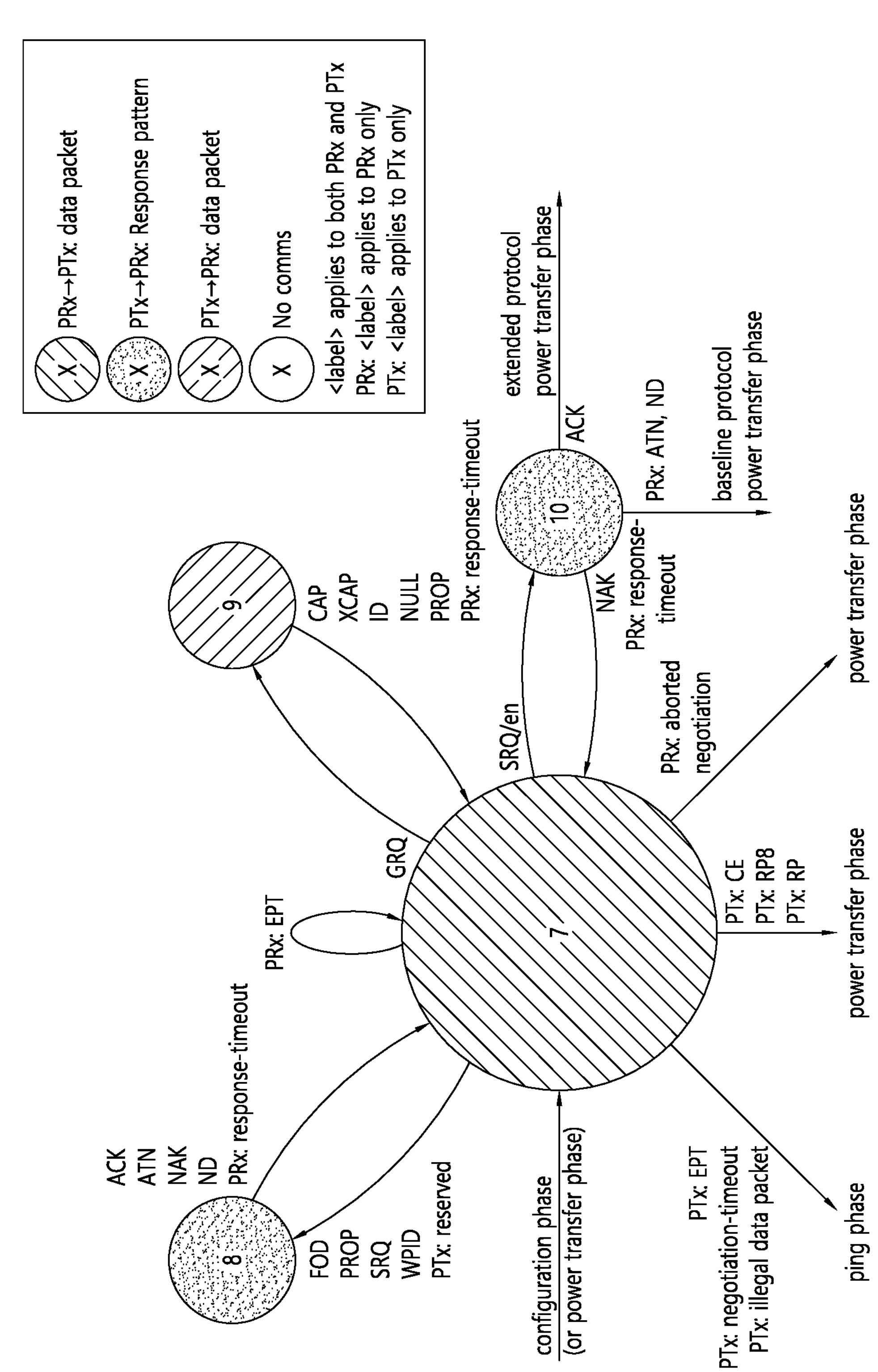
FIG. 32 schematically illustrates a state diagram in the negotiation phase.

FIG. 32 schematically illustrates a state diagram in the negotiation phase.

According to FIG. 32, state 7 can be entered from the configuration phase (or power transfer phase).

In terms of state 7/state 8, the wireless power transmitter and the wireless power receiver may operate as follows. Here, in state 7, the wireless power receiver may transmit an SRQ to the wireless power transmitter, and in state 8, the wireless power transmitter may transmit a response pattern to the wireless power receiver.

Meanwhile, in terms of state 7/state 9, the wireless power transmitter and the wireless power receiver may operate as follows. Here, in state 7, the wireless power receiver may transmit GRQ to the wireless power transmitter, and in state 9, the wireless power transmitter may transmit data packets, such as CAP and XCAP, to the wireless power receiver.

Under the above background, a method for transmitting information related to a power transfer protocol supported in each state between a wireless power transmitter and a wireless power receiver will be described in more detail.

In an embodiment of the present specification to be described below, from state 1 to stage 7, the PPDE and Qi standard (e.g. EPP) may proceed in the same way.

Here, first, in terms of State 7/8, a configuration in which the wireless power receiver requests the wireless power transmitter whether PDE of the wireless power receiver is supported through an SRQ packet transmitted from the wireless power receiver to the wireless power transmitter, and the wireless power transmitter responds to the request may be provided. Also, from a state 7/9 perspective, a configuration in which the wireless power transmitter requests the wireless power receiver whether or not to support the PDE of the wireless power transmitter through a GRQ-related packet transmitted from the wireless power transmitter to the wireless power receiver, and the wireless power receiver responds to the request may be provided.

First of all, from a state 7/8 perspective, through the SRQ packet transmitted from the wireless power receiver to the wireless power transmitter, a configuration in which the wireless power receiver requests the wireless power transmitter to determine whether the PDE of the wireless power receiver is supported and the wireless power transmitter responds to the request will be described in more detail.

FIG. 33 illustrates an example when information related to a supported power transfer protocol is transmitted through an SRQ packet.

According to FIG. 33, from state 1 to state 7, PPDE and Qi standard (e.g. EPP) can proceed in the same way.

Here, in the state 7/8 relationship, through an SRQ packet transmitted from the wireless power receiver to the wireless power transmitter, it requests to return whether PDE of wireless power receiver is supported by the wireless power transmitter, and the wireless power transmitter can respond to this request.

In other words, after using BPP as a basis, the wireless power transmitter and the wireless power receiver may enter the EPP and enter a negotiation phase according to the ACK of the wireless power transmitter transmitted in state 6.

Then, in the negotiation phase of state 7, if the wireless power receiver wants to enter PDEx, it sends SRQ/pde (tentative name) to the wireless power transmitter, requesting that the wireless power transmitter support PDEx, the wireless power transmitter can respond to this. Then, the wireless power transmitter and wireless power receiver can enter PDEx.

Here, when the embodiment provided in this specification is provided according to the framework of SRQ, information requesting whether or not this SRQ supports PPDE may be indicated through a 'Request' field. Here, SRQ may be configured as follows. For example, the value of the 'Request' field may be set to 0x07, and the mnemonic at this time may be determined as SRQ/ppde. And the 'name' at this time can be named as whether or not PPDE is supported.

Meanwhile, as above, if the 'request' field indicates information requesting whether or not this SRQ supports PPDE, the parameter value at this time may be configured as, for example, 0x01, i.e. PDE1 (e.g. Apple magsafe), 0x02, i.e. PDE2 (e.g. Huawei super charger), 0x03, i.e. PDE3 (e.g. Xiaomi Turbo charger), 0x04, i.e. PDE4 (e.g. LGE PPDE), etc. The example at this time is only for convenience of description, and the embodiments of the present specification are not limited to the above example.

Figure 34:
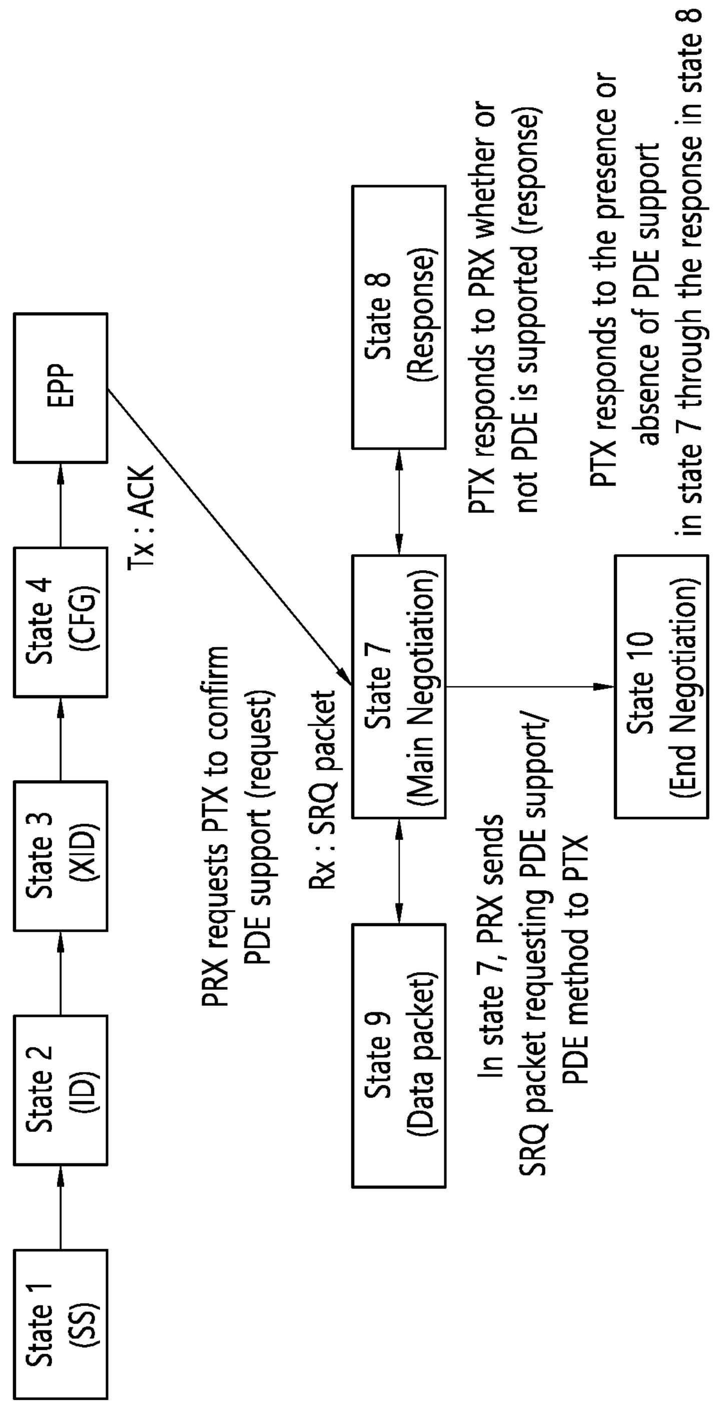
FIG. 34 illustrates an example of when information related to a supported power transfer protocol is transmitted through an SRQ packet in another form.

FIG. 34 illustrates an example of when information related to a supported power transfer protocol is transmitted through an SRQ packet in another form.

According to FIG. 34, entry into state 1 (SS), state 2 (ID), state 3 (XID), state 4 (CFG), and EPP may proceed in the same manner as the existing procedure.

Thereafter, in state 7 (main negotiation), the wireless power receiver may transmit information related to a power transfer protocol supported by the wireless power receiver through the above-described SRQ packet. In other words, the wireless power receiver may make a request to the wireless power transmitter to confirm PDE support. That is, the wireless power receiver may request the wireless power transmitter to check whether the wireless power transmitter supports a PDE supported by the wireless power receiver itself. As another expression, the wireless power receiver in state 7 may send an SRQ packet to the wireless power transmitter and request the wireless power transmitter to confirm PDE support/PDE scheme.

Here, in state 8, the wireless power transmitter may respond to the wireless power receiver as to whether or not to support the PDE received from the wireless power receiver. That is, the wireless power transmitter may respond to the presence or absence of PDE support in state 7 through the response in state 8.

If the example of FIG. 34 is expressed differently, it is as follows. 34 shows an SRQ packet sent from a wireless power receiver to a wireless power transmitter, the wireless power receiver requests the wireless power transmitter to return whether or not PPDE is supported, information can also be delivered about the type of PPDE (PDEx). Accordingly, the wireless power transmitter may respond to whether the requested PDEx is supported by responding to the received SRQ/ppde.

That is, the wireless power receiver can send an SRQ packet to the wireless power transmitter when it wants to support PDEx. Here, the parameter in the SRQ may include information on the type of PPDE supported by the wireless power receiver (in other words, information on the type of PPDE desired to be supported by the wireless power transmitter).

The wireless power transmitter may send an ACK to the wireless power receiver when supporting the requested (inquired) PDEx. On the other hand, if the wireless power transmitter does not support the above, NAK/ND may be sent to the wireless power receiver.

As described above, if both the wireless power transmitter and the wireless power receiver agree on PDEx, the 'End Negotiation' ends and the PDEx protocol can be entered. If the wireless power transmitter returns NAK rather than ACK to the wireless power receiver for 'End Negotiation (SRQ/en)', state 7 may be entered. In addition, in the case of ND, BPP may proceed.

Hereinafter, in terms of State 7/9, through a packet related to GRQ transmitted from the wireless power transmitter to the wireless power receiver, a configuration in which the wireless power transmitter requests the wireless power receiver whether or not the "PDE of the wireless power transmitter" is supported and the wireless power receiver responds to the request will be described in more detail.

According to an embodiment of the present specification, from state 1 to state 7, PPDE and Qi standard (EPP) may proceed in the same way. Here, in relation to state 7/9, it is possible to check whether the wireless power transmitter supports PDE through the GRQ packet transmitted from the wireless power transmitter to the wireless power receiver.

Basically, based on BPP, in state 6, EPP is entered by ACK of the wireless power transmitter, and negotiation phase is entered. Then, in the negotiation phase of state 7, if the wireless power receiver wants to enter PDEx, the wireless power receiver sends GRQ/xcap, cap, id to the wireless power transmitter, it may confirm a request for support for PDEx of the wireless power transmitter.

Here, through GRQ, the wireless power receiver may request confirmation of PPDE support through XCAP/CAP/ID.

As a response to the above GRQ, the wireless power transmitter may transmit CAP, XCAP, ID, etc. to the wireless power receiver, information about the PDE type supported by the wireless power transmitter and whether the PDE type is supported may be transmitted through CAP, XCAP, ID, and the like.

As shown in FIG. 34, the method of confirming the PDE in the negotiation phase using SRQ/pde (tentative name) is a method for branching from EPP to the upper PDE, and has the advantage of being able to request PDE branching from PTx through SRQ/pde. That is, branching may be selectively possible for a specific PDE.

If PDE is not supported or support is rejected, PTx responds with ACK/NAK by SRQ/pde of PRx, whether or not to proceed to the PDE protocol can be determined (if PTx responds with NAK to NAK or several SRQ/pde requests for all PDEs, it can proceed to EPP).

That is, PRx has the advantage of being able to branch into a protocol to a PDE that PTx ACKs by sending SRQ/pde several times. That is, there may be an advantage that the PDE branch can be retried.

FIG. 35 schematically illustrates an example of a CAP according to an embodiment of the present specification.

According to FIG. 35, the CAP may include information about the PDE type and information about the PDE.

FIG. 36 schematically illustrates an example of XCAP according to an embodiment of the present specification.

According to FIG. 36, XCAP may include information about a PDE type and information about a PDE.

FIG. 37 schematically illustrates an example of an ID according to an embodiment of the present specification.

According to FIG. 37, the ID may include information about the PDE type and information about the PDE.

As described above, information on PDE types and information on PDEs may be included in all of FIGS. 35 to 37, and at this time Information on the PDE type may be configured as, for example, 0x01, i.e. PDE1 (e.g. Apple magsafe), 0x02, i.e. PDE2 (e.g. Huawei super charger), 0x03, i.e. PDE3 (e.g. Xiaomi Turbo charger), 0x04, i.e. PDE4 (e.g. LGE PPDE), etc. The example at this time is only for convenience of description, and the embodiments of the present specification are not limited to the above example.

Information on whether PDE is supported may be composed of, for example, '0' or '1'. For example, '1' may be information indicating that PDE is supported, and '0' may be information indicating that PDE is not supported. Meanwhile, depending on implementation, '0' may be information indicating that PDE is supported, and '1' may be information indicating that PDE is not supported.

Meanwhile, in the present specification and drawings, an example including, for example, 'PDE' bits and 'PDE type' information is described in a CAP, XCAP, or ID packet, but this is only an example for understanding the present specification. Accordingly, in the present specification, for example, an example including only 'PDE type' information in the above packets may also be provided. And, when there is only information indicating the PDE type in the above packets, the information indicating the PDE type at this time may mean that the above PDE type is necessarily supported.

Figure 38:
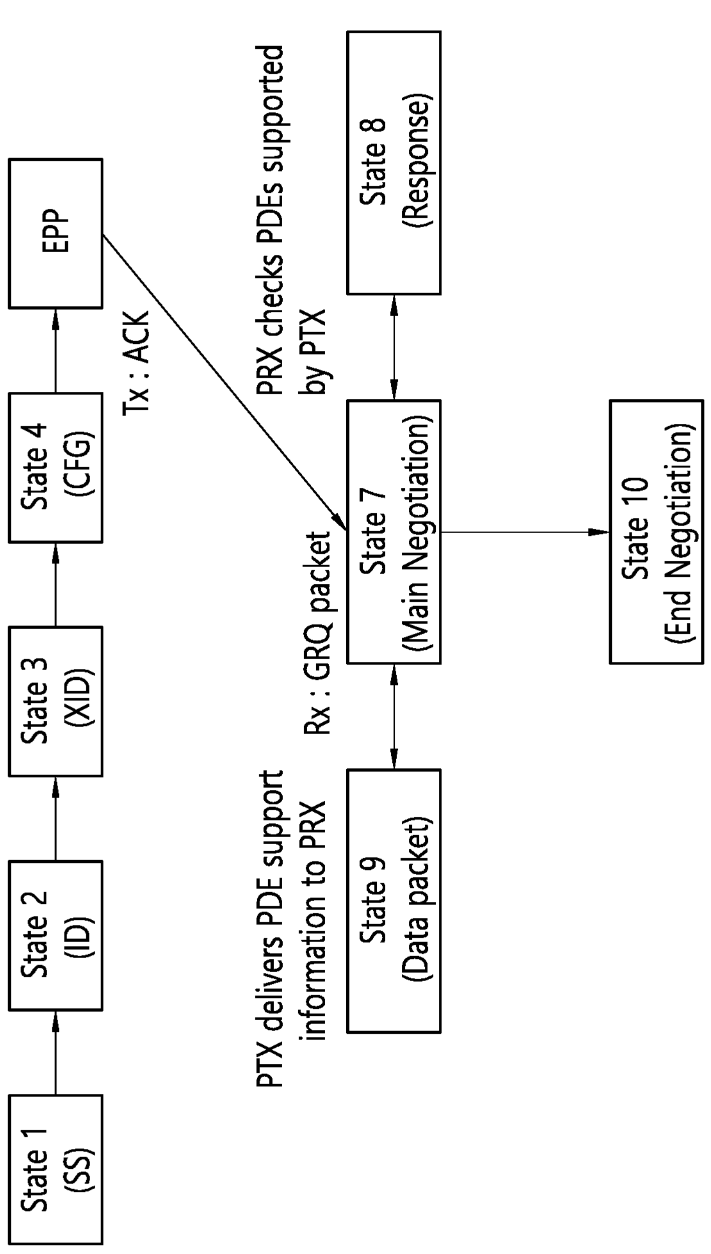
FIG. 38 illustrates the examples of FIGS. 35 to 37 in another form.

FIG. 38 illustrates the examples of FIGS. 35 to 37 in another form.

According to FIG. 38, entry into state 1 (SS), state 2 (ID), state 3 (XID), state 4 (CFG), and EPP may proceed in the same manner as the existing procedure.

Then, in state 7, the wireless power receiver may transmit the previously described GRQ packet to the wireless power transmitter, and in state 9, the wireless power transmitter may transmit information related to a PDE supported by the wireless power transmitter to the wireless power receiver.

If the example of FIG. 38 is expressed differently, it is as follows. As shown in FIG. 38, the wireless power receiver requests a data packet from the wireless power transmitter by transmitting a GRQ packet to the wireless power transmitter, the wireless power transmitter may return a packet such as XCAP/CAP/ID. Information on the type of PPDE (PDEx) may be included in the returned packet. The wireless power receiver receiving the above information as a reply can check the PDEx supported by the wireless power transmitter.

That is, the wireless power receiver can send a GRQ packet to check the PPDE supported by the wireless power transmitter, at this time, information requested by the wireless power receiver to the wireless power transmitter may be a packet such as XCAP/CAP/ID. A packet such as XCAP/CAP/ID returned by the wireless power transmitter may include information on whether or not PPDE is supported/type. At this time, reserved bits of CAP, XCAP, and ID may be used to mark the presence and type of PDE support.

According to FIG. 38, PRx can check the type of PDE supported by PTx through GRQ/pde. Here, if PRx does not receive GRQ/pde, PTx cannot know whether or not PDE is supported and the type of support.

At this point, PRx may have an advantage of being able to select after checking the information in the GRQ/pde when selecting the SRQ/pde. Meanwhile, hereinafter, a method for requesting PPDE support will be described by defining a new GRQ and response information therefor.

FIG. 39 illustrates an example of information requesting information related to a power transfer protocol supported by a wireless power transmitter.

According to FIG. 39, GRQ may be used as information requesting information related to a power transfer protocol supported by a wireless power transmitter.

The GRQ at this time may include information requesting whether to support PPDE, and the information value at this time may be set to 0x4F. In addition, the mnemonic at this time may be determined like PPDE, and the 'name' at this time may be named as whether or not PPDE is supported.

At this time, the wireless power transmitter receiving the GRQ may return information related to the newly defined PDE to the wireless power receiver.

FIG. 40 schematically illustrates an example of information related to a newly defined PDE.

According to FIG. 40, information related to PDEs may include information indicating whether each of a plurality of PDEs is supported.

For example, as in (a) of FIG. 40, information related to the PDE may include information on whether or not PDE1 is supported (e.g. PDE1), information on whether PDE2 is supported (e.g. PDE2), information on whether PDE3 is supported (e.g. PDE3), . . . , information on PDEX support (e.g. PDEX), etc.

Here, as an example, each PDE type may be configured as follows 0x01: PDE1 (e.g. Apple magsafe); 0x02: PDE2 (e.g. Huawei super charger); 0x03: PDE3 (e.g. Xiaomi Turbo charger); 0x04: PDE4 (e.g. LGE PPDE), etc.

In this case, for example, in the case of a wireless power transmitter supporting 'apple'/'xiaomi'/'lge ppde', an example of PDE information (ie, PDE packet) may be defined as shown in (b) of FIG. 40.

Another explanation of this content is as follows. From state 1 to state 7, the PPDE and Qi standard (EPP) can proceed identically. In state 7/9, whether or not the wireless power transmitter supports PDE may be confirmed through a GRQ packet (GRQ/pde (tentative name)) transmitted from the wireless power transmitter to the wireless power receiver.

First, based on BPP, EPP may be entered by ACK of the wireless power transmitter in state 6, and a negotiation phase may be entered. In the negotiation phase, which is state 7, if the wireless power receiver wants to enter PDEx, it can send GRQ/pde (tentative name) to confirm the wireless power transmitter's support request for PDEx. Each bit of the PDE packet sent by the wireless power transmitter can indicate whether or not PDE is supported, in this case, 1 may mean support, and 0 may mean non-support.

By receiving a PDE packet from the wireless power transmitter, the wireless power receiver can learn about PDEs supportable by the wireless power transmitter among various PDEs.

Figure 41:
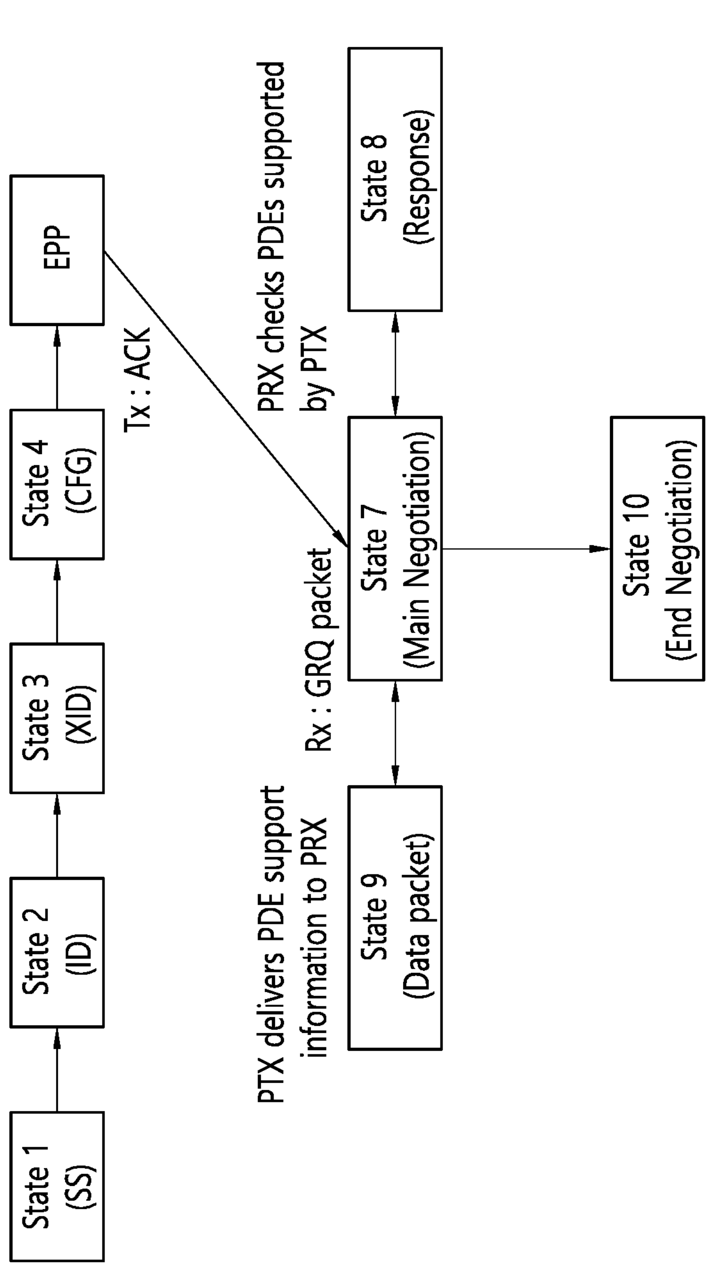
FIG. 41 shows the example of FIG. 40 in another form.

FIG. 41 shows the example of FIG. 40 in another form.

According to FIG. 40, entry into state 1 (SS), state 2 (ID), state 3 (XID), state 4 (CFG), and EPP may proceed in the same manner as the existing procedure.

Then, in state 7, the wireless power receiver may transmit the previously described GRQ packet to the wireless power transmitter, in state 9, the wireless power transmitter may transfer information related to a PDE supported by the wireless power transmitter to the wireless power receiver.

Expressing the example of FIG. 40 differently is as follows. As shown in FIG. 40, the wireless power receiver may transmit a GRQ packet to the wireless power transmitter, and the wireless power transmitter may return a packet such as a PDE packet. The returned packet may include information about the type of PPDE (PDEx). Accordingly, the wireless power receiver can check the PDEx supported by the wireless power transmitter.

That is, the wireless power receiver may transmit a GRQ packet to check the PPDE supported by the wireless power transmitter, and GRQ at this time may be GRQ/pde. A packet such as a PDE packet returned by the wireless power transmitter may include information on whether or not PPDE is supported.

According to FIG. 41, PRx can check the type of PDE supported by PTx through GRQ/pde. Here, if PRx does not receive GRQ/pde, PTx cannot know whether or not PDE is supported and the type of support.

At this point, PRx may have an advantage of being able to select after checking the information in the GRQ/pde when selecting the SRQ/pde.

Hereinafter, embodiments of the present specification will be described again from various subject points of view.

The following drawings are made to explain a specific example of the present specification. Since the names of specific devices or names of specific signals/messages/fields described in the drawings are provided as examples, the technical features of the present specification are not limited to the specific names used in the drawings below.

Figure 42:
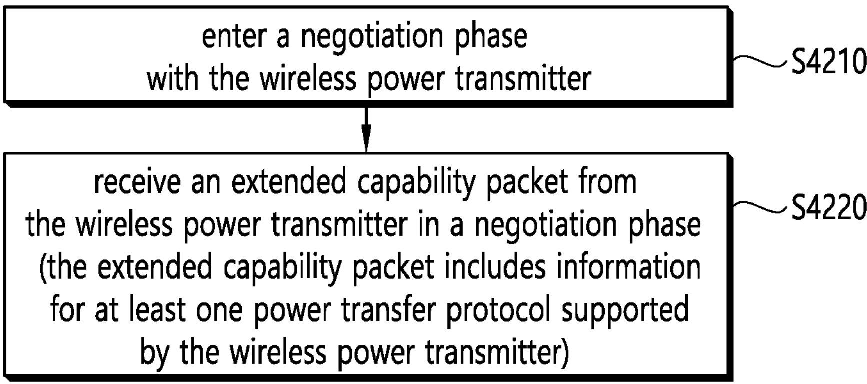
FIG. 42 is a flowchart of a method of transmitting support information from the viewpoint of a wireless power receiver according to an embodiment of the present specification.

FIG. 42 is a flowchart of a method of transmitting support information from the viewpoint of a wireless power receiver according to an embodiment of the present specification.

The wireless power receiver may enter a configuration phase with the wireless power transmitter (S4210). Here, since a specific example for this is as described above, description of redundant content will be omitted in order to omit unnecessary repetition.

The wireless power receiver may transmit the support information to the wireless power transmitter in the configuration phase (S4220). Here, since a specific example for this is as described above, description of redundant content will be omitted in order to omit unnecessary repetition.

Here, the support information may include information related to a power transfer protocol supported by the wireless power receiver. Here, since a specific example for this is as described above, description of redundant content will be omitted in order to omit unnecessary repetition.

Although not separately shown, the present specification may provide a wireless power receiver. The wireless power receiver may be a wireless power receiver including a power pickup unit related to receiving wireless power from a wireless power transmitter and a communication/control unit related to communicating with the wireless power transmitter and controlling reception of the wireless power, where the communication/control unit is configured to enter a configuration phase with the wireless power transmitter, is configured to transmit support information to the wireless power transmitter in the configuration phase, where the support information includes information related to a power transfer protocol supported by the wireless power receiver. Here, since a specific example for this is as described above, description of redundant content will be omitted in order to omit unnecessary repetition.

Figure 43:
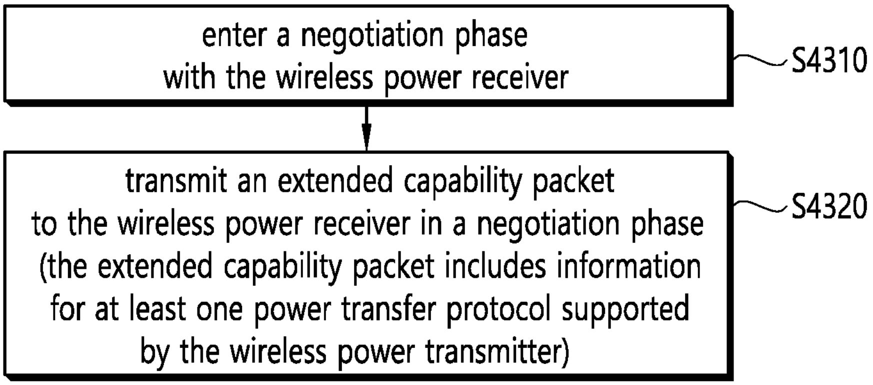
FIG. 43 is a flowchart of a method of receiving support information from a wireless power transmitter perspective according to an embodiment of the present specification.

FIG. 43 is a flowchart of a method of receiving support information from a wireless power transmitter perspective according to an embodiment of the present specification.

According to FIG. 43, the wireless power transmitter may enter a configuration phase with the wireless power receiver (S4310). Here, since a specific example for this is as described above, description of redundant content will be omitted in order to omit unnecessary repetition.

The wireless power transmitter may receive the support information from the wireless power receiver in the configuration phase (S4320). Here, since a specific example for this is as described above, description of redundant content will be omitted in order to omit unnecessary repetition.

Here, the support information may include information related to a power transfer protocol supported by the wireless power receiver. Here, since a specific example for this is as described above, description of redundant content will be omitted in order to omit unnecessary repetition.

Although not separately shown, the present specification may provide a wireless power transmitter. The wireless power transmitter may be a wireless power transmitter including a power conversion unit related to transmitting wireless power to a wireless power receiver and a communication/control unit related to communicating with the wireless power receiver and controlling transmission of the wireless power, where the communication/control unit is configured to enter a configuration phase with the wireless power receiver, is configured to receive support information from the wireless power receiver in the configuration phase, where the support information includes information related to a power transfer protocol supported by the wireless power receiver. Here, since a specific example for this is as described above, description of redundant content will be omitted in order to omit unnecessary repetition.

So far, the embodiments of the present specification have been described. According to an embodiment of the present specification, the WPC Qi standard and the PPDE of each member company are compatible with each other.

Accordingly, an effect may occur where a wireless power receiver to which an embodiment of the present specification is applied can receive wireless power at high speed from a wireless power transmitter that supports only the manufacturer's own power profile (e.g. PPDE (Proprietary Power Delivery Extension) 1, PPDE2) instead of EPP.

Similarly, an effect that a wireless power transmitter to which an embodiment of the present specification is applied can transmit wireless power at high speed to a wireless power receiver supporting only a power profile unique to a manufacturer instead of an EPP may occur.

In particular, according to the present specification, it is possible to know whether the wireless power transmitter/wireless power receiver supports a specific PDE in the configuration phase, which is a phase prior to entering the negotiation phase.

Here, considering that the negotiation phase in the current Qi standard configuration is a phase entered under the assumption that EPP is supported, as in this specification, if it is confirmed whether a specific PDE is supported in the configuration phase prior to the negotiation phase, an effect that can prevent a wireless power transmitter/wireless power receiver in which EPP is not supported from entering the EPP unnecessarily occurs. And according to the above effect, the advantage that the protocol of wireless power transmission can be simplified can also be provided.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for a wireless power transfer system, the method performed by a wireless power receiver and comprising:

transmitting a signal strength packet to a wireless power transmitter;

transmitting an identification (ID) packet to the wireless power transmitter, wherein the ID packet includes first 1-bit information related to capabilities of a power profile;

transmitting an extended identification (XID) packet including 8-bit information related to the power profile to the wireless power transmitter, wherein the power profile is a different profile from a baseline power profile (BPP) or an extended power profile (EPP), wherein the XID packet further includes second 1-bit information related to whether the wireless power receiver operates based on the power profile; and after transmitting the XID packet, transmitting a configuration (CFG) packet to the wireless power transmitter.

2. The method of claim 1, further comprising:

in response to the CFG packet, receiving a Frequency Shift Keying (FSK) response from the wireless power transmitter.

3. The method of claim 2, wherein the wireless power receiver proceeds as the EPP based on the FSK response having an acknowledgement (ACK) signal, wherein the wireless power receiver proceeds as the BPP based on a timeout of the FSK response.

4. A wireless power receiver in a wireless power transfer system:

a power pickup related to receive wireless power from a wireless power transmitter; and a communicator/controller related to communicate with the wireless power transmitter and control reception of the wireless power, wherein the wireless power receiver is configured for:

transmitting a signal strength packet to the wireless power transmitter;

transmitting an identification (ID) packet to the wireless power transmitter, wherein the ID packet includes first 1-bit information related to capabilities of a power profile;

transmitting an extended identification (XID) packet including 8-bit information related to the power profile to the wireless power transmitter, wherein the power profile is a different profile from a baseline power profile (BPP) or an extended power profile (EPP), wherein the XID packet further includes second 1-bit information related to whether the wireless power receiver operates based on the power profile; and after transmitting the XID packet, transmitting a configuration (CFG) packet to the wireless power transmitter.

5. The wireless power receiver of claim 4, wherein the wireless power receiver is further configured for:

in response to the CFG packet, receiving a Frequency Shift Keying (FSK) response from the wireless power transmitter.

6. The wireless power receiver of claim 5, wherein the wireless power receiver proceeds as the EPP based on the FSK response having an acknowledgement (ACK) signal, wherein the wireless power receiver proceeds as the BPP based on a timeout of the FSK response.

* * * * *